(12) United States Patent
Chan et al.

(10) Patent No.: US 8,885,473 B2
(45) Date of Patent: Nov. 11, 2014

(54) METHOD FOR MEASUREMENT OF ASYMMETRIC NETWORK CAPACITIES

(71) Applicant: The Hong Kong Polytechnic University, Hong Kong (CN)

(72) Inventors: Edmond W. W. Chan, Hong Kong (CN); Xiapu Luo, Hong Kong (CN); Rocky K. C. Chang, Hong Kong (CN)

(73) Assignee: The Hong Kong Polytechnic University, Hong Kong (CN)

( * ) Notice: Subject to any disclaimer, the term of this patent is extended or adjusted under 35 U.S.C. 154(b) by 80 days.

(21) Appl. No.: 13/688,464

(22) Filed: Nov. 29, 2012

(65) Prior Publication Data

US 2013/0136020 A1 May 30, 2013

Related U.S. Application Data

(60) Provisional application No. 61/564,869, filed on Nov. 30, 2011.

(51) Int. Cl.
*H04L 12/26* (2006.01)

(52) U.S. Cl.
CPC ............ *H04L 43/0864* (2013.01); *H04L 43/12* (2013.01); *H04L 43/0882* (2013.01); *H04L 43/10* (2013.01)
USPC ............................ 370/234; 370/231; 370/232

(58) Field of Classification Search
CPC . H04L 43/0864; H04L 43/10; H04L 43/0882; H04L 43/12
USPC .................................. 370/234, 232, 231, 252
See application file for complete search history.

(56) References Cited

U.S. PATENT DOCUMENTS

| | | | |
|---|---|---|---|
| 6,850,541 B2 | 2/2005 | Gross | |
| 7,519,294 B2 | 4/2009 | Bullock | |
| 8,531,952 B2 | 9/2013 | Chan et al. | |
| 2004/0243335 A1 | 12/2004 | Gunawardena et al. | |
| 2008/0250147 A1 | 10/2008 | Knibbeler et al. | |
| 2010/0315958 A1 | 12/2010 | Luo et al. | |
| 2011/0128864 A1 | 6/2011 | Chan et al. | |
| 2013/0136020 A1 | 5/2013 | Chan et al. | |

OTHER PUBLICATIONS

C. Dovrolis, P. Ramanathan, and D. Moore, •Packet Dispersion Techniques and a Capacity—Estimation Methodology,• IEEE/ACM Trans. Netw., 12(6), 2004.

(Continued)

*Primary Examiner* — Omer S Mian
(74) *Attorney, Agent, or Firm* — Jiazhong Luo; Duane Morris LLP

(57) ABSTRACT

Disclosed is a method for achieving efficient and accurate measurement of path capacities of a communication network. The method includes the following steps: (a) transmitting a number of probes from a local node to a remote node over a forward network path, each probe contains at least one probe packet and can elicit the remote node to transmit a number of response packets to the local node over a reverse network path; (b) determine for each response packet a minimum round-trip packet delay between the time transmitting the probe and the time receiving the response packet; (c) calculate a number of pair-wise minimum delay differences from the minimum round-trip packet delays. The number of pair-wise minimum delay differences can be used as a measurement of the forward capacity, reverse capacity, faster-path capacity, slower-path capacity and a degree of capacity asymmetry between the local node and the remote node.

20 Claims, 14 Drawing Sheets

(56) References Cited

OTHER PUBLICATIONS

D. Croce, T. En-Najjary, G. Urvoy-Keller, and E. Biersack, "Capacity Estimation of ADSL Links," Proc. ACM CoNEXT, 2008, Dec. 10-12, 2008, Madrid Spain.

S. Saroiu, P. Gummadi, and S. Gribble, "SProbe: A Fast Technique for Measuring Bottleneck Bandwidth in Uncooperative Environments," Proc. IEEE INFOCOM, 2002.

M. Dischinger, A. Haeberlen, K. Gummadi, and S. Saroiu, •Characterizing Residential Broadband Networks,• Proc. ACM/USENIX IMC, 2007.

L. Chen, T. Sun, G. Yang, M. Sanadidi, and M. Gerla, •End-to-End Asymmetric Link Capacity Estimation,• Proc. IFIP International Fedearation for Information Processing 2005.

X. Luo, E. Chan, and R. Chang, •Design and Implementation of TCP Data Probes for Reliable and Metric-Rich Network Path Monitoring,• Proc. USENIX Annual Tech. Conf., 2009.

METHOD FOR MEASUREMENT OF ASYMMETRIC NETWORK CAPACITIES

CROSS-REFERENCE OF RELATED APPLICATIONS

This application claims the benefit of U.S. Provisional Application No. 61/564,869, filed Nov. 30, 2011, which application is expressly incorporated by reference herein in its entirety.

FIELD OF THE INVENTION

The present invention relates to a method of measuring forward capacity, reverse capacity, faster-path capacity, reverse-path capacity, and degree of capacity asymmetry of a round-trip path in a communication network. Particularly, it relates to a method and apparatus of using minimum network delay estimates and their pair-wise differences for achieving efficient and accurate asymmetric network path capacities measurement.

BACKGROUND OF THE INVENTION

Many network applications can benefit from the knowledge of network capacity of an end-to-end network path. Network capacity is referred to as the transmission rate of the slowest link of a set of network links, forming a network path from a source to a destination. It is often one of the metrics required in the diagnostic services for network performance. Due to the proliferations of ADSL, DOCSIS cable networks, VSAT, and others, the downstream data rate ($C_{dn}$) and the upstream data rate ($C_{up}$) of a round-trip network path are usually different. For example, the $C_{up}$ and $C_{dn}$ for the existing xDSL technologies are determined by many factors, such as the wire quality, transmission distance and different broadband offerings, and the data rates span a wide range. Therefore, a forward path that traverses from a source to a destination and a reverse path that traverses from the destination back to the source can possess different network capacities.

Measuring network paths with asymmetric capacities is a challenging problem. Forward capacity of a network path from a measuring node to a remote node, reverse capacity of a network path from the remote node to the measuring node, faster-path capacity (maximum of the forward capacity and reverse capacity), and slower-path capacity (minimum of the forward capacity and reverse capacity) are collectively known as asymmetric capacities. A possible approach to measuring the four types of asymmetric capacities is to perform two one-way measurements on the forward and reverse directions. However, many existing one-way measurement tools, such as pathrate proposed in C. Dovrolis, P. Ramanathan, and D. Moore, "Packet dispersion techniques and a capacity-estimation methodology," IEEE/ACM Trans. Netw., 12(6), 2004, require controlling both nodes of a path, thus making this approach impractical for measurement with arbitrary remote nodes. On the other hand, only few tools—DSLprobe proposed in D. Croce, T. En-Najjary, G. Urvoy-Keller, and E. Biersack, "Capacity estimation of ADSL links," Proc. ACM CoNEXT, 2008 and SProbe proposed in S. Sarouiu, P. Gummadi, and S. Gribble, "SProbe: A fast technique for measuring bottleneck bandwidth in uncooperative environments," Proc. IEEE INFOCOM, 2002 based on packet-dispersion methods, and the flooding-based method proposed in M. Dischinger, A. Haeberlen, K. Gummadi, and S. Saroiu, "Characterizing residential broadband networks," Proc. ACM/USENIX IMC, 2007—can be used for measuring asymmetric capacities without installing additional software at the remote node, but their utility is limited by the restrictions on packet size.

All existing tools for measuring asymmetric capacities (AsymProbe proposed in L. Chen, T. Sun, G. Yang, M. Sanadidi, and M. Gerla, "End-to-end asymmetric link capacity estimation," Proc. IFIP Networking, 2005, DSLprobe, SProbe, and the flooding-based method) generally require setting probe packets much larger than response packets to measure the forward capacity, and setting probe packets much smaller than response packets to measure the reverse capacity. Such requirement introduces two serious limitations. First, they cannot measure all degrees of capacity asymmetry, because the packet size is upper bounded by the path Maximum Transmission Unit (MTU). Second, they generally cannot support all measurement scenarios, because they may not be able to elicit response packets of the required size from the remote node. For example, DSLprobe elicits only small TCP Reset (RST) packets (but not large response packets) from remote residential broadband users. Moreover, compared with the packet-dispersion method, the flooding-based method performs the measurement by sending high-rate packet trains to saturate the bottleneck link, and the packet rate limits the maximum capacity it can measure.

As a result, the need remains for a reliable method in communication networks which obtains the four asymmetric capacities accurately, rapidly and efficiently without the asymmetric packet sizes requirement or overwhelming the bottleneck link.

SUMMARY OF THE INVENTION

The present invention provides a new method and apparatus for measuring forward capacity, reverse capacity, faster-path capacity, slower-path capacity, and degree of capacity asymmetry of a round-trip network path between a measuring node and a remote node in a communication network without overwhelming the bottleneck link or using asymmetric packet sizes.

In accordance with some embodiments, a method comprises the following steps: First, a plurality of probes is transmitted from a local node to a remote node over a digital communication network such that a plurality of responses is received by the local node. Each of said plurality of probes comprises at least one probe packet and is configured by said local node to cause: (a) the at least one probe packet traverse an identical forward network path from the local node to the remote node, (b) the at least one probe packet elicit the remote node to transmit a said response comprising a plurality of response packets, and (c) the plurality of response packets traverse an identical reverse network path from the remote node to said local node. Second, for each of the plurality of response packets a minimum round-trip packet delay between the time transmitting the probe and the time receiving the response packet is determined. Third, a plurality of pair-wise minimum delay differences is determined from said plurality of minimum round-trip packet delays. The plurality of pair-wise minimum delay differences are used by the local node to compute network path capacities and a degree of capacity asymmetry between said local node and the remote node.

As a particular embodiment of the present invention, the measuring node dispatches a sequence of compound probes, each consisting of four data packets to the remote node along a forward path from the measuring node to the remote node. The first and second data packets are dispatched back-to-back and are referred to as the first probe packet and second probe packet of a round-trip packet pair (1-RTP), respectively. Each probe packet of the 1-RTP elicits a single response packet from the remote node to the measuring node along a reverse path from the remote node back to the measuring node. After receiving the two response packets, the third and fourth data packets are also dispatched back-to-back and are referred to as the first probe packet and second probe packet of a two-way packet pair ((1,1)-TWP), respectively. Unlike the 1-RTP, only the second probe packet of the (1,1)-TWP elicits two back-to-back response packets from the remote node. It is sufficient to obtain correct measurement results when all probe and response packets in 1-RTPs and (1,1)-TWPs are of the same packet size S.

The measuring node computes two round-trip time (RTT) estimates $d_{R0}$ and $d_{R1}$ for the first and second response packets of a 1-RTP and two RTT estimates $d_{T0}$ and $d_{T1}$ for the first and second response packets of a (1,1)-TWP. A RTT is referred to as the duration between the time when the first probe packet of a 1-RTP or a (1,1)-TWP is sent and the time when a corresponding response packet is received. The measuring node also obtains four minimum RTT estimates which are a minimum of $d_{R0}$ (or min_$d_{R0}$), a minimum of $d_{R1}$ (or min_$d_{R1}$), a minimum of $d_{T0}$ (or min_$d_{T0}$), and a minimum of $d_{T1}$ (or min_$d_{T1}$) from the sequence of probes. Using the four minimum RTT estimates, the forward capacity estimate is computed as S divided by the difference between min_$d_{T0}$ and min_$d_{R0}$. The reverse capacity estimate is computed as S divided by the difference between min_$d_{T1}$ and min_$d_{T0}$. The faster-path capacity estimate is computed as S divided by the difference between min_$d_{T1}$ and min_$d_{R1}$. The slower-path capacity estimate is computed as S divided by the difference between min_$d_{R1}$ and min_$d_{R0}$.

As an embodiment of the present invention, the four minimum RTT estimates are also used to measure the degree of capacity asymmetry of a round-trip path without computing the four asymmetric capacity estimates. The degree of capacity asymmetry is referred to as the ratio of the forward capacity to the reverse capacity. A round-trip path is said to be capacity-asymmetric when the forward capacity and reverse capacity are different or capacity-symmetric otherwise. The round-trip path is further classified as either a fast-reverse (FR) path if the ratio falls between zero and one, exclusively, or a fast-forward (FF) path if the ratio is greater than one.

To estimate the degree of capacity asymmetry of a round-trip path, the present invention computes two quantities based on the four minimum RTT estimates. The first quantity is the difference between min_$d_{T1}$ and min_$d_{T0}$ divided by the difference between min_$d_{R1}$ and min_$d_{R0}$, and the second quantity is the difference between min_$d_{R1}$ and min_$d_{R0}$ divided by the difference between min_$d_{T1}$ and min_$d_{R0}$. If the first quantity falls between (0,1) and the second quantity is close to one, then the round-trip path is an FR path. If the first quantity is close to one and the second quantity is greater than one, then the path is an FF path. Moreover, if both the first and second quantities are close to one, then the path is capacity-symmetric.

As an embodiment of the present invention, the minimum RTT estimates min_$d_{R0}$, min_$d_{R1}$, and min_$d_{T1}$ are used to verify whether a round-trip path is capacity-symmetric or capacity-asymmetric. The present invention computes the difference between min_$d_{T1}$ and min_$d_{R0}$ divided by the difference between min_$d_{R1}$ and min_$d_{R0}$. The logarithm of the estimate to base two is close to one for a capacity-symmetric path, and falls between (0,1) for both FF and FR paths.

As an embodiment of the present invention, a measuring node implements the probe by using the OneProbe's probing technique proposed in X. Luo, E. Chan, and R. Chang, "Design and implementation of TCP data probes for reliable and metric-rich network path monitoring," Proc. USENIX Annual Tech. Conf., 2009. To implement a 1-RTP, the measuring node sends two back-to-back probe Transmission Control Protocol (TCP) data packets, each consisting of a 2× Maximum Segment Size (MSS)-byte TCP receive window (rwnd), to a remote TCP node which is induced to respond to each probe packet with a response TCP data packet. Both the probe TCP data packet and response TCP data packet have the same packet size controlled by the probing technique. To implement a (1,1)-TWP, the measuring node inserts a zero rwnd in the first probe packet of a 1-RTP to suppress any response packet induced by the first probe packet, and a (2×MSS)-byte rwnd in the second probe packet to induce two back-to-back response TCP data packets from the remote node.

As an embodiment of the present invention, a measuring node can conduct client-side or server-side measurement to a remote node to estimate asymmetric capacities and degree of capacity asymmetry. The client-side measurement allows a measuring node to perform the measurement to any remote web server. The server-side measurement, on the other hand, facilitates the measurement to any remote web client. In both cases, the measurement can be conducted without additional software installed at the remote node.

As an embodiment of the present invention, the measuring node implements four self-diagnosis tests to improve the measurement accuracy. First, due to the OneProbe's probing technique, the measuring node can detect and remove all packet pairs that do not elicit the expected response TCP data packets in order to ensure that all RTT estimates used for the capacity measurement come from lossless and order-preserved probe and response packets. Second, the measuring node invalidates all current estimates unless the following inequality is fulfilled: min_$d_{R0}$<min_$d_{T0}$≤min_$d_{R1}$<min_$d_{T1}$. Third, the measuring node invalidates the current asymmetric capacity estimates, unless (i) the slower-path capacity estimate is close to the minimum of the forward capacity and reverse capacity estimates and (ii) the faster-path capacity estimate is close to the maximum of the forward capacity and reverse capacity estimate. Fourth, the measuring node invalidates the current estimate of the degree of capacity asymmetry, unless (i) the difference between min_$d_{R1}$ and min_$d_{R0}$ divided by the difference between min_$d_{T1}$ and min_$d_{R0}$ is no smaller than one, (ii) the difference between min_$d_{T1}$ and min_$d_{T0}$ divided by the difference between min_$d_{R1}$ and min_$d_{R0}$ falls in (0,1], and (iii) the logarithm of the difference between min_$d_{T1}$ and min_$d_{R0}$ divided by the difference between min_$d_{R1}$ and min_$d_{R0}$ to the base 2 falls in (0,1].

As an important aspect of the present invention, using minimum RTT estimates obtained from 1-RTP and (1,1)-TWP eliminates the measurement limitations suffered by the existing packet-dispersion and flooding-based methods. Particularly, using only the three minimum RTT estimates min_$d_{R0}$, min_$d_{T0}$, and min_$d_{T1}$ suffices for the sole purpose of measuring both forward capacity and reverse capacity. The fourth minimum RTT estimate min_$d_{R1}$ can be additionally gleaned from 1-RTPs to measure the faster-path capacity, the slower-path capacity and the degree of capacity asymmetry, and to determine whether or not the target network path is capacity-asymmetric. Moreover, the present invention can obtain accurate results for any degree of capacity asymmetry without using asymmetric packet sizes. In contrast, the existing packet-dispersion and flooding-based methods can measure only forward capacity and reverse capacity and require different probe-to-response packet size ratios. Moreover, they can underestimate the capacities in the midst of high degree of capacity asymmetry.

In accordance with some embodiments, the digital communication network is the Internet. The forward network path comprises a plurality of nodes. The reverse network path also comprises a plurality of nodes. The pluralities of nodes can be linked by wire, wireless, or mixed wire and wireless connections. In some embodiments, the local node is a computer terminal such as a TCP client. The remote node is a server such as a TCP server. The local node establishes at least one TCP connection with the remote node; and the probe packet and response packet are TCP data packets containing payload data and are transmitted through the at least one TCP connection. In other embodiments, the local node is server such as a TCP server. The remote node is a computer terminal such as a TCP client. The remote node establishes at least one TCP connection with the local node; and the probe packet and response packet are TCP data packets containing payload data and are transmitted through the at least one TCP connection.

In another aspect, the present disclosure also provides an apparatus or a system which is configured to perform the steps as described. In some embodiments, the present disclosure also provides an article comprising a form of tangible, non-transient machine readable storage media encoded with computer program code, which can be loaded into and executed on an apparatus or a system to perform the steps as described. The apparatus or system can comprise a computer or other processor.

The various features of novelty which characterize the invention are pointed out with particularity in the claims annexed to and forming a part of this disclosure. For a better understanding of the invention, its operating advantages and specific objects attained by its use, reference should be made to the drawings and the following description in which there are illustrated and described preferred embodiments of the invention.

BRIEF DESCRIPTION OF THE DRAWINGS

The objects, features and advantages of the present invention will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which.

DETAILED DESCRIPTION OF PARTICULAR EMBODIMENTS OF THE INVENTION

An Overview

Figure 1:
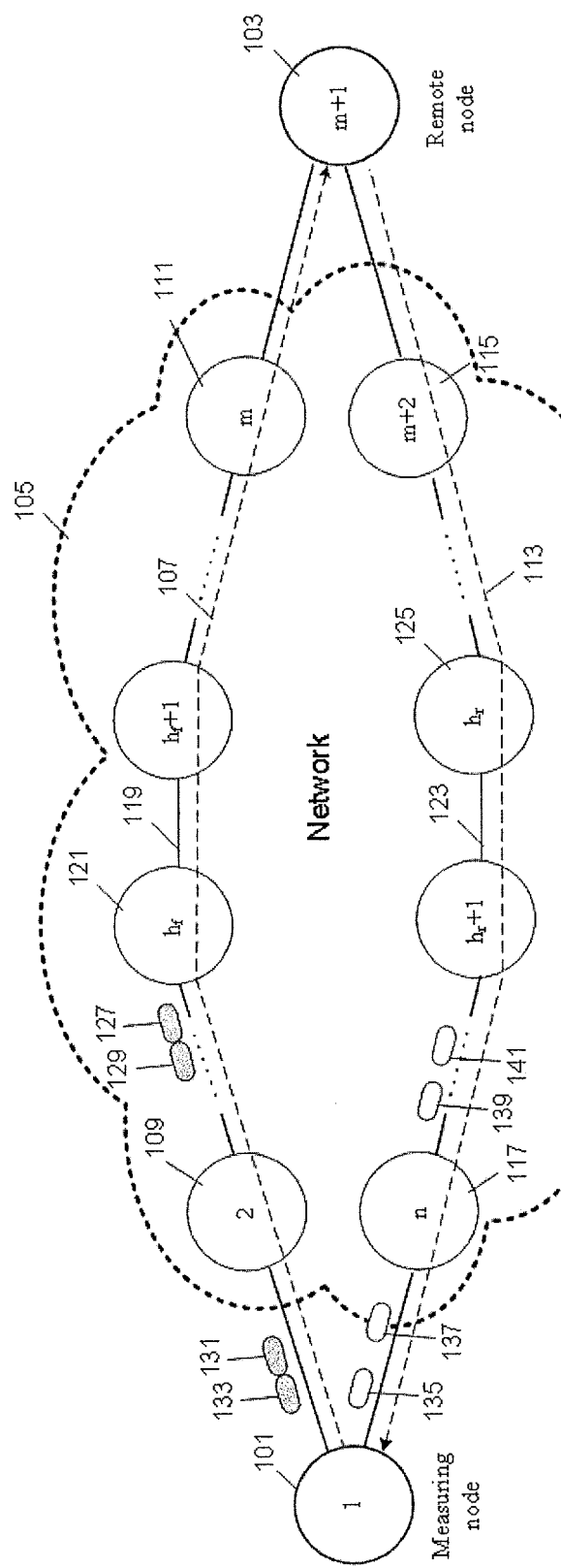
FIG. 1 is a diagram illustrating an exemplary capacity measurement scenario according to the present invention.

FIG. 1 is a block diagram illustrating a particular embodiment in accordance with the present invention. It comprises a measuring node 101 and a remote node 103. The measuring node 101 sends a 1-RTP with two back-to-back probe packets 127 and 129 to the remote node 103 through a network 105 which usually includes multiple hops (such as, routers and switches). The remote node 103, in response to receiving probe packet 127, sends a response packet 135 to the measuring node 101; and in response to receiving probe packet 129, sends a response packet 137 to the measuring node 101. After receiving the response packets 135 and 137, the measuring node 101 sends a (1,1)-TWP with two back-to-back probe packets 131 and 133 to the remote node 103 through the network 105; and the remote node 103, after receiving both 131 and 133, sends two back-to-back response packets 139 and 141 to the measuring node 101. There are n (where n≥4) nodes, including the measuring node 101 and the remote node 103, on the round-trip path which comprises the forward path 107 and the reverse path 113. The measuring node 101 first sends the probe packets to network node 109, and network node m 111 (where 1≤m<n) subsequently forwards the probe packets 127, 129, 131, and 133 to the remote node 103. In response to receiving the probe packets 127, 129, 131, and 133, the remote node sends the response packets 131, 133, 135, and 137 to network node m+2 115 and network node n 117 subsequently forwards the response packets 131, 133, 135, and 137 to the measuring node 101.

The forward path 107 and reverse path 113 together can be seen as a concatenation of n hops. Each hop consists of a node and its outgoing network link. The $h^{th}$ hop transmits packets to the outgoing link with a rate of $C^{(h)}$ in bits/second. The network link 119 which belongs to $h_f^{th}$ hop has the smallest link capacity on the forward path 107. That is, all the hops beyond $h_f^{th}$ hop on the forward path 107, if any, have higher link capacity than 119. The network link 123 which belongs to $h_r^{th}$ hop has the smallest link capacity on the reverse path 113. That is, all the hops beyond $h_r^{th}$ hop on the reverse path, if any, have higher capacity than 123.

There are four types of path capacity metrics: forward-path capacity (denoted by $C_f$), reverse-path capacity (denoted by $C_r$), faster-path capacity (denoted by $C_B$), and slower-trip capacity (denoted by $C_b$):

$$C_f \equiv C^{(h_f)} = \min_{1 \leq h \leq m} C^{(h)}, \quad \text{Equation 1a}$$

$$C_r \equiv C^{(h_r)} = \min_{m+1 \leq h \leq n} C^{(h)}, \quad \text{Equation 1b}$$

$$C_B = \max\{C_f, C_r\}, \quad \text{Equation 1c}$$

$$C_b = \min\{C_f, C_r\}. \quad \text{Equation 1d}$$

The slower-path capacity is often referred to as round-trip capacity. When $C_f \neq C_r$ is true, the round-trip path is a capacity-asymmetric path. Moreover, the degree of capacity asymmetry of a round-trip path is denoted by $C_{f/r}$, where $C_{f/r} = C_f/C_r$. The capacity-asymmetric path can be further classified into fast-reverse (FR) path if $C_{f/r} < 1$ and fast-forward (FF) path if $C_{f/r} > 1$. The degree of capacity asymmetry obviously decreases with $C_{f/r}$ for an FR path but increases with $C_{f/r}$ for an FF path.

Figure 2:
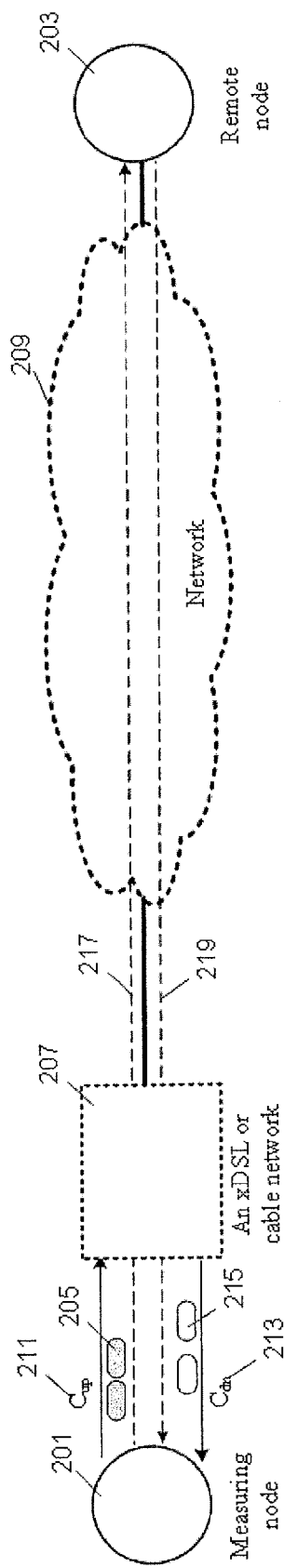
FIG. 2 is a block diagram illustrating a fast-reverse path scenario of a particular embodiment in accordance with the present invention.

FIG. 2 is a block diagram illustrating a fast-reverse path scenario of a particular embodiment in accordance with the present invention. It comprises a capacity-asymmetric path with a measuring node 201 and a remote node 203. The measuring node 201 sends a pair of probe packets 205, which can be either a 1-RTP or a (1,1)-TWP, via a forward path 217 to the remote node 203 through a directly connected xDSL or cable network 207 with an upstream data rate $C_{up}$ 211. The network 207 then forwards the probe packets 205 to the remote node 203 through another network 209. In response to receiving the probe packets 205, the remote node 203 sends a pair of response packets 215 to the measuring node 201 via a reverse path 219 which includes hops in both the networks 207 and 209. The network 207 sends the response packets 215 back to the measuring node 201 with a downstream data rate $C_{dn}$ 213, where $C_{up} < C_{dn}$. Eventually, the asymmetric capacities measurement is performed on the round-trip path with $C_{f/r} = C_{up}/C_{dn}$, and the path is an FR path.

Figure 3:
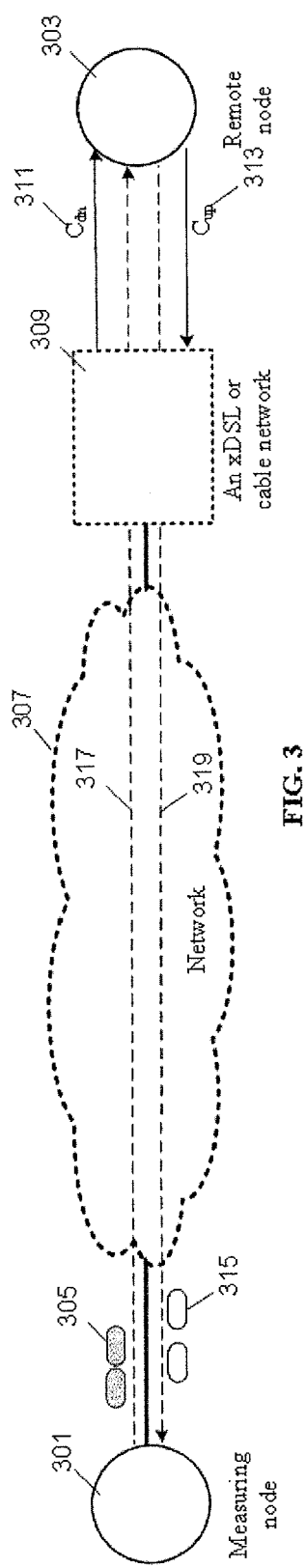
FIG. 3 is a block diagram illustrating a fast-forward path scenario of a particular embodiment in accordance with the present invention.

FIG. 3 is a block diagram illustrating a fast-forward path scenario of a particular embodiment in accordance with the present invention. It comprises a capacity-asymmetric path with a measuring node 301 and a remote node 303. The measuring node 301 sends a pair of probe packets 305, which can be either a 1-RTP or a (1,1)-TWP, via a forward path 317 which includes hops in a network 307 and an xDSL or cable network 309. The remote node 303 is directly connected to the xDSL or cable network 309 and receives the probe packets 305 with a downstream data rate $C_{dn}$ 311. In response to receiving 305, the remote node 303 sends a pair of response packets 315 via a reverse path 319 back to the remote node 301 through the network 309 with an upstream data rate $C_{up}$ 313, where $C_{up} < C_{dn}$. Eventually, the asymmetric capacities measurement is performed on the round-trip path with $C_{f/r} = C_{dn}/C_{up}$, and the path is an FF path.

Figure 4:
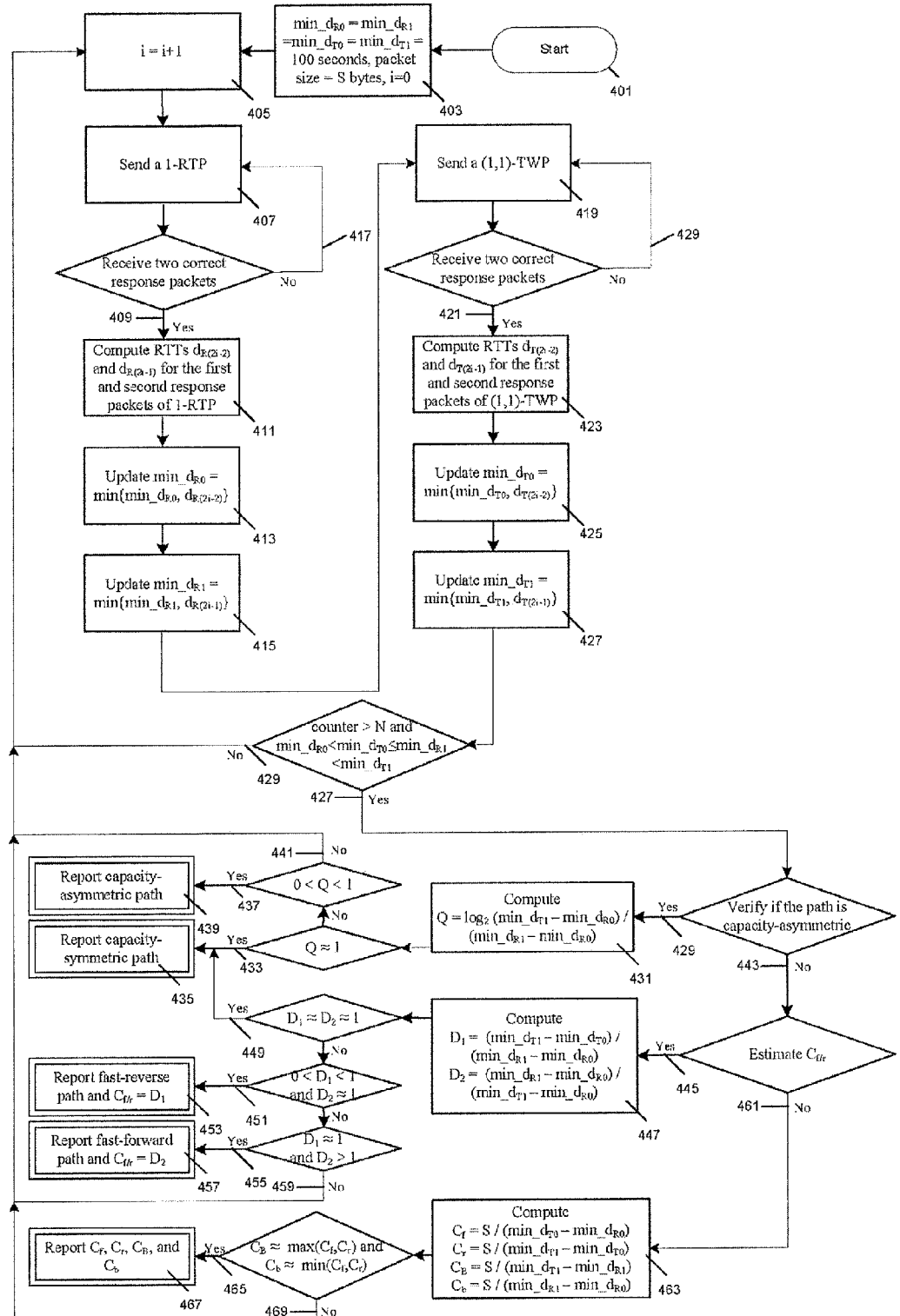
FIG. 4 is a flow chart illustrating the steps in an asymmetric capacities measurement session of a particular embodiment of the present invention.

FIG. 4 is a flow chart illustrating the steps in an asymmetric capacities measurement session of a particular embodiment of the present invention. After the measurement begins (in step 401), the measuring node first initializes min_$d_{R0}$ (the minimum RTT between sending the first packet of a 1-RTP and receiving the first response packet), min_$d_{R1}$ (the minimum RTT between sending the first packet of a 1-RTP and receiving the second response packet), min_$d_{T0}$ (the minimum RTT between sending the first packet of a (1,1)-TWP and receiving the first response packet), and min_$d_{T1}$ (the minimum RTT between sending the first packet of a (1,1)-TWP and receiving the second response packet) to a reasonably large value, for example, 100 seconds and size for both probe and response packets of 1-RTPs and (1,1)-TWPs to S bytes; and reset counter i to zero (step 403). After the counter i is increased by one (step 405), the measuring node dispatches a 1-RTP with two back-to-back probe packets (step 407), each of which is of size S will elicit a response packet of size S from the remote node. If the two response packets are received correctly (step 409), their RTT $d_{R(2i-2)}$ and $d_{R(2i-1)}$ will be computed (in step 411). The RTT of a response packet is measured by the difference of the arrival time of a response packet and the sending time of the first packet in the 1-RTP. In steps 413 and 415, the min_$d_{R0}$ and min_$d_{R1}$ are updated, respectively. If the two response packets are not received correctly (step 417), the 1-RTP will be resent (step 407).

After min_$d_{R0}$ and min_$d_{R1}$ are updated, the measuring node dispatches a (1,1)-TWP with two back-to-back probe packets (step 419), each of which is of size S, and only the second probe packet will elicit a pair of back-to-back response packets, each of which is of size S, from the remote node. If the two response packets are received correctly (step 421), their round-trip time (RTT) $d_{T(2i-2)}$ and $d_{T(2i-1)}$ will be computed in step 423. The RTT of a response packet is measured by the difference of the arrival time of a response packet and the sending time of the first packet in the (1,1)-TWP. In steps 425 and 427, the min_$d_{T0}$ and min_$d_{T1}$ are updated, respectively. If the two response packets are not correctly received (step 429), the (1,1)-TWP will be resent. After that, if the counter is greater than a predefined value N and the inequality min_$d_{R0}$<min_$d_{T0}$≤min_$d_{R1}$<min_$d_{T1}$ is fulfilled, the estimation process will begin (step 427); otherwise, the minimum RTTs have not converged and therefore the measurement is continued (step 429).

During the estimation process, if the measurement is to verify whether or not the round-trip path is capacity-asymmetric path (step 429), the measuring node will compute Q in step 431. If Q is close to one (step 433), the measuring node will report the path as a capacity-symmetric path in step 435. If Q falls in the range of (0,1) in step 437, then the node will report the path as a capacity-asymmetric path in step 439. Otherwise, the minimum RTTs have not converged and the measurement is continued (step 441).

Otherwise after step 443, if the measurement is to estimate the degree of capacity asymmetry (step 445), the measuring node will compute $D_1$ and $D_2$ in step 447. If both $D_1$ and $D_2$ are close to one (step 449), the measuring node will report the path as a capacity-asymmetric path in step 435 and therefore $C_{f/r}$ is one. If $D_1$ falls in (0,1) but $D_2$ is close to one in step 451, the measuring node will report the path as an FR path and $C_{f/r} = D_1$ in step 453. If $D_1$ is close to one but $D_2$ falls in (0,1) in step 455, the measuring node will report the path as an FF path and $C_{f/r} = D_2$ in step 457. Otherwise, the minimum RTTs have not converged and the measurement is continued in step 459.

Otherwise after 461, the four asymmetric capacities estimates $C_f$, $C_r$, $C_B$ and $C_b$ will be computed in step 463. If $C_B \approx \max\{C_f, C_r\}$ and $C_b \approx \min\{C_f, C_r\}$ (step 465), then the four estimates will be reported in step 467; otherwise, the measurement is repeated in step 469.

The k-Round-Trip Probe

The measuring node dispatches a k-round-trip probe (k-RTP) with k+1 back-to-back probe packets $\{p_{j-k}, \ldots, p_j\}$, each of which elicits a single response packet from the remote node. Let $S_f$ and $S_r$ denote the probe packet size and response packet size in bits, respectively; $S_{f/r} = S_f/S_r$ denotes the packet-size asymmetry, and the delay of transmitting a probe/response packet at $h^{th}$ hop by $X^{(h)}$: $X^{(h)} = S_f/C^{(h)}$ for $1 \le h \le m$ (i.e., the forward path) and $X^{(h)} = S_r/C^{(h)}$ for $h > m$ (i.e., the reverse path). The packet dispersion method measures the round trip packet dispersion, denoted by $\delta_{j-k,j}$, which is the time elapsed between receiving the first and last packets from the sequence of k+1 response packets $\{r_{j-k}, \ldots, r_j\}$. For k=1, the probe is usually known as a packet pair, and the dispersion as packet-pair dispersion (PPD). For k>1, the probe is a packet train and the dispersion is known as packet-train dispersion (PTD). If none of the probe and response packets is affected by the cross traffic on the path, the unbiased packet dispersion is given by $$\delta_{j-k,j} = \max_{1 \le h \le n} \{kX^{(h)}\} = k \times \max\{X^{(h_f)}, X^{(h_r)}\}. \quad \text{Equation 2}$$

$X^{(h_f)} = S_f/C^{(h_f)}$ and $X^{(h_r)} = S_r/C^{(h_r)}$ are the forward PPD and reverse PPD, respectively, which are generated by the $h_f^{th}$ hop and the $h_r^{th}$ hop.

To measure the forward capacity, it is therefore necessary to set $S_{f/r} \ge C_{f/r}$ in order to obtain the forward dispersion $kX^{(h_f)}$, and the forward capacity estimate computed based on the unbiased $\delta_{j-k,j}$ and $S_f$ can yield $$C_f = (kS_f)/\delta_{j-k,j}. \quad \text{Equation 3a}$$

To measure the reverse capacity, it is, however, necessary to set $S_{f/r} \le C_{f/r}$ in order to obtain the reverse dispersion $kX^{(h_r)}$, and the reverse capacity estimate computed based on the unbiased $\delta_{j-k,j}$ and $S_r$ can yield $$C_r = (kS_r)/\delta_{j-k,j}. \quad \text{Equation 3b}$$

Figure 5:
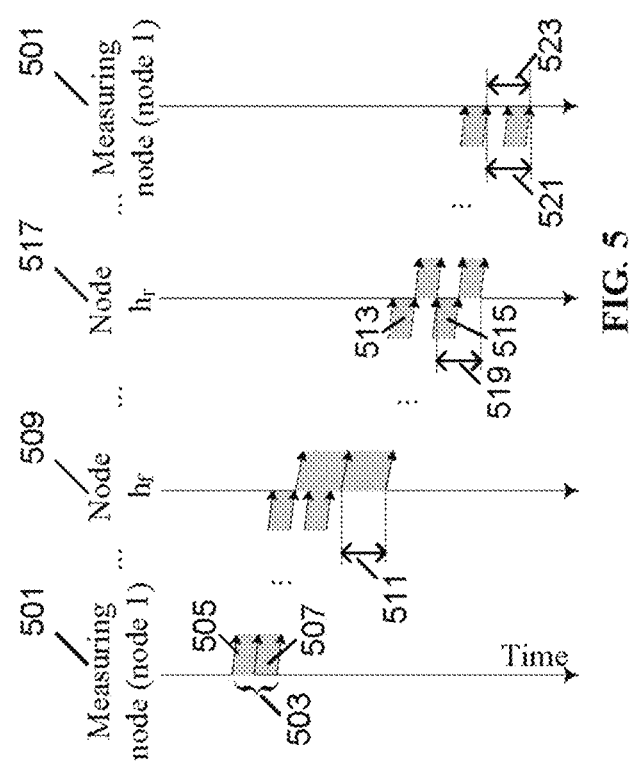
FIG. 5 is a time-line diagram illustrating an exemplary measurement session with a 2-RTP to measure forward dispersion and forward capacity.

FIG. 5 is a time-line diagram illustrating an exemplary measurement session with a 2-RTP to measure forward dispersion and forward capacity. Therefore, each k-RTP is a packet pair. For this path, $X^{(h_f)} > X^{(h_r)}$. According to Equation 2, a measuring node 501 measures the forward dispersion $X^{(h_f)}$ and the forward capacity according to Equation 3a by dispatching a sequence of sufficiently spaced out packet pairs.

An $l^{th}$ packet pair 503 consisting of a first probe packet $p_{2l-1}$ 505 and a second probe packet $p_{2l}$ 507 is dispatched. The two probe packets subsequently arrive at node $h_f$ 509 and leave the node back to back with a dispersion of $X^{(h_f)}$ 511. The two probe packets elicit response packets $r_{2l-1}$ 513 and $r_{2l}$ 515, respectively, and the response packets arrive at node $h_r$ 517 and leave with a dispersion of $X^{(h_f)}$ 519. The two response packets subsequently arrive at the measuring node 501 with a dispersion of $X^{(h_f)}$ 521. As a result, the dispersion $\delta_{2l-1,2l}$ 523 observed at 501 obtains an unbiased $X^{(h_f)}$ which results in a correct forward capacity estimate.

Figure 6:
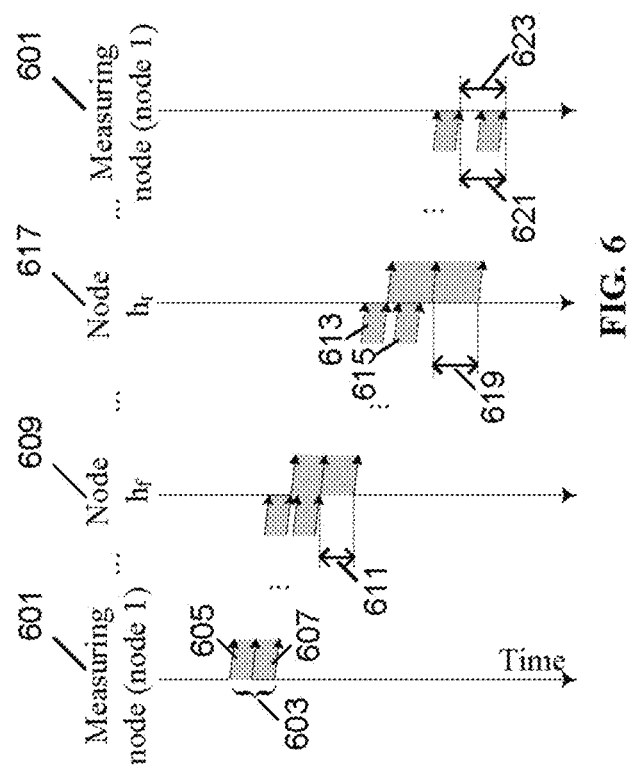
FIG. 6 is a time-line diagram illustrating an exemplary measurement session with a 2-RTP to measure reverse dispersion and reverse capacity.

FIG. 6 is a time-line diagram illustrating an exemplary measurement session with a 2-RTP to measure reverse dispersion and reverse capacity. Similarly, each k-RTP is a packet pair. For this path, $X^{(h_f)} < X^{(h_r)}$. According to Equation 2, a measuring node 601 measures the reverse dispersion $X^{(h_r)}$ and the reverse capacity according to Equation 3b by dispatching a sequence of sufficiently spaced out packet pairs.

An $l^{th}$ packet pair 603 consisting of a first probe packet $p_{2l-1}$ 605 and a second probe packet $p_{2l}$ 607 is dispatched. The two probe packets subsequently arrive at node $h_f$ 609 and leave the node back to back with a dispersion of $X^{(h_f)}$ 611. The two probe packets elicit response packets $r_{2l-1}$ 613 and $r_{2l}$ 615, respectively, and the response packets arrive at node $h_r$ 617 with a dispersion $X^{(h_f)}$. Since $X^{(h_f)} < X^{(h_r)}$, the two response packets leave the node $h_r$ back to back with a dispersion of $X^{(h_r)}$ 619. The two response packets subsequently arrive at the measuring node 601 with a dispersion of $X^{(h_r)}$ 621. As a result, the dispersion $\delta_{2l-1,2l}$ 623 observed at 601 obtains an unbiased $X^{(h_r)}$ and therefore a correct reverse capacity estimate.

Figure 7:
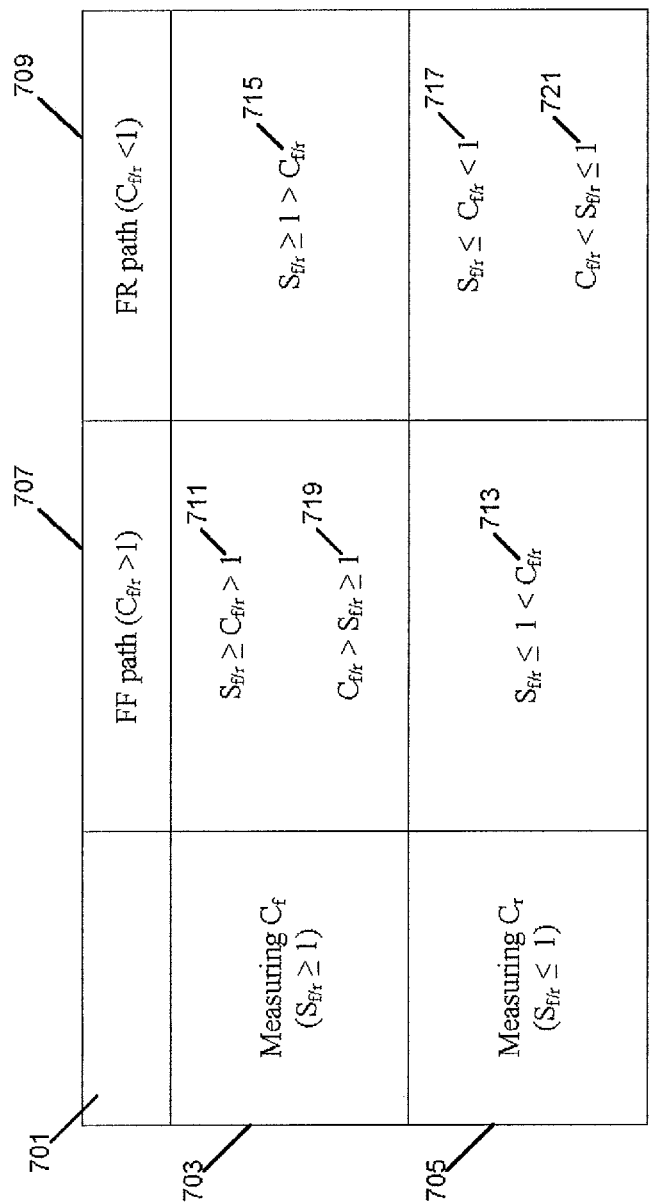
FIG. 7 is a table illustrating six possible scenarios of using k-RTP to measure forward capacity and reverse capacity for fast-forward and fast-reverse paths.

FIG. 7 is a table illustrating six possible scenarios of using k-RTP to measure forward capacity and reverse capacity for fast-forward and fast-reverse paths. In the table 701, the first row 703 illustrates the possible scenarios when the measuring node uses $S_{f/r} \ge 1$ to measure forward capacity; the second row 705 illustrates the possible scenarios when the measuring node uses $S_{f/r} \le 1$ to measure reverse capacity; the first column 707 illustrates the possible scenarios when the round-trip path for the measurement is an FF path with $C_{f/r} > 1$; and the second column 709 illustrates the possible scenarios when the round-trip path for the measurement is an FR path with $C_{f/r} < 1$. The table 701 shows that scenarios 711 and 715 give the correct forward capacity estimates because they satisfy the condition $S_{f/r} \ge C_{f/r}$, and scenarios 713 and 717 give the correct reverse capacity estimates because they satisfy the condition $S_{f/r} \le C_{f/r}$. Scenarios 719 and 721, however, do not give the correct estimates due to the insufficient degree of packet-size asymmetry. In both scenarios, the measuring node underestimates the faster-path capacity due to the packet dispersion resulted from the slower-path bottleneck.

Figure 8:
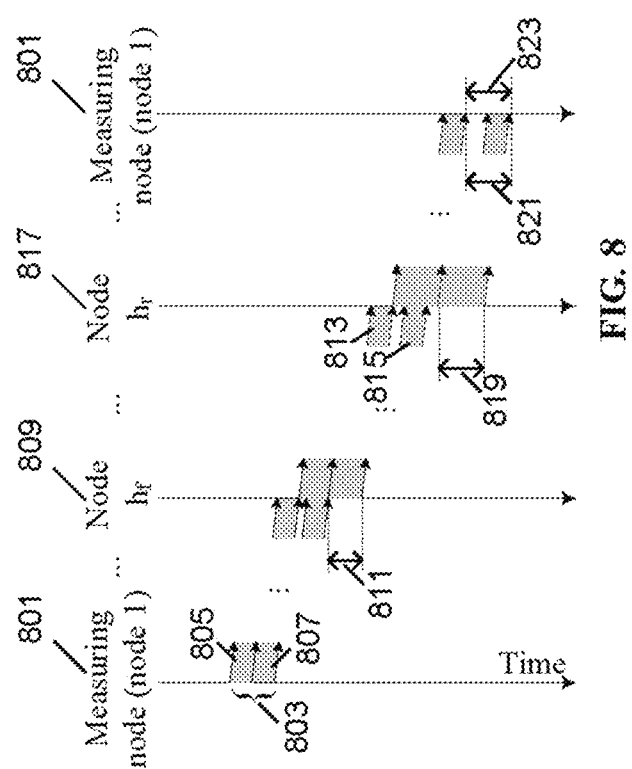
FIG. 8 is a time-line diagram illustrating an exemplary measurement session with a 2-RTP that results in an under-estimated forward capacity.

FIG. 8 is a time-line diagram illustrating an exemplary measurement session with a 2-RTP that results in an underestimated forward capacity. For this path, because $C_{f/r} > S_{f/r}$, which corresponds to the scenario 719 in FIG. 7, a measuring node 701 actually measures the reverse dispersion $X^{(h_r)} > X^{(h_f)}$. As a result, the measuring node will obtain an underestimated forward capacity according to Equation 3a.

An $l^{th}$ packet pair 803 consisting of a first probe packet $p_{2l-1}$ 805 and a second probe packet $p_{2l}$ 807 is dispatched. The two probe packets subsequently arrive at node $h_f$ 809 and leave back to back with a dispersion of $X^{(h_f)}$ 811. The two probe packets then elicit response packets $r_{2l-1}$ 813 and $r_{2l}$ 815, respectively, with a dispersion $X^{(h_f)}$. However, since $X^{(h_f)} < X^{(h_r)}$, the two response packes arrive at node $h_r$ 817 and leave the node back to back with a dispersion of $X^{(h_r)}$ 819. The two response packets subsequently arrive at the measuring node 801 with a dispersion of $X^{(h_r)}$ 821. As a result, the dispersion $\delta_{2l-1,2l}$ 823 observed at 801 obtains $X^{(h_r)}$ and therefore an underestimated forward capacity estimate.

Figure 9:
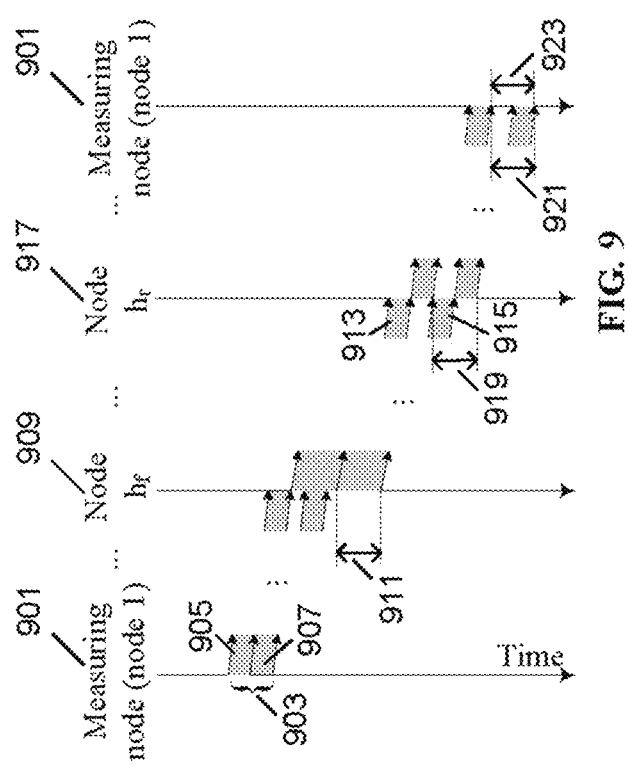
FIG. 9 is a time-line diagram illustrating an exemplary measurement session with a 2-RTP that results in an under-estimated reverse capacity.

FIG. 9 is a time-line diagram illustrating an exemplary measurement session with a 2-RTP that results in an underestimated reverse capacity. For this path, since $C_{f/r} < S_{f/r}$, which corresponds to the scenario 721 in FIG. 7, a measuring node 901 actually measures the forward dispersion $X^{(h_f)} > X^{(h_r)}$. Therefore, the measuring node will obtain an underestimated reverse capacity according to Equation 3b.

An $l^{th}$ packet pair 903 consisting of a first probe packet $p_{2l-1}$ 905 and a second probe packet $p_{2l}$ 907 is dispatched. The two probe packets subsequently arrive at node $h_f$ 909 and leave the node back to back with a dispersion of $X^{(h_f)}$ 911. The two probe packets subsequently elicit response packets $r_{2l-1}$ 913 and $r_{2l}$ 915, respectively. However, because $X^{(h_f)} > X^{(h_r)}$, the two response packets arrive at node $h_r$ 917 and leave with a dispersion of $X^{(h_f)}$ 919. The response packets subsequently arrive at the measuring node 901 with a dispersion of $X^{(h_f)}$ 921. As a result, the dispersion $\delta_{2l-1,2l}$ 923 observed at 901 obtains $X^{(h_f)}$ and an underestimated reverse capacity estimate.

Unfortunately, the packet-size asymmetry is limited by the practical path Maximum Transmission Unit (MTU). Let $S_{max}$ and $S_{min}$ be the maximally and minimally permitted packet size. Therefore, $S_{min}/S_{max} \le S_{f/r} \le S_{max}/S_{min}$. Using $S_f$ or $S_r$ larger than path MTU introduces serious problems to the k-RTP measurement, because the probe or response packets will be fragmented along the path. When the fragmentation occurs before a bottleneck, the IP headers of the additional fragments will increase the packet dispersion obtained by the measuring node. Therefore, the measuring node should obtain the resultant packet size for the k-RTP measurement, but knowing the new $S_f$ generally requires capturing all probe fragments from the remote node. The packet dispersion can also be biased by the post-bottleneck fragmentation, because the fragments may queue one another at a post-bottleneck link due to the size increase.

The (v,k)-Two-Way Probe

The measuring node dispatches a (v,k)-two-way probe ((v, k)-TWP), where v,k≥0, which comprises a sequence of v+1 back-to-back probe packets $\{p_{u-v}, \ldots, p_u\}$. The probe packets are customized to induce from the remote node a sequence of k+1 back-to-back response packets $\{r_{j-k}, \ldots, r_j\}$ upon $p_u$'s arrival. However, the remote node will ignore other preceding probe packets $\{p_{u-v}, \ldots, p_{u-1}\}$. Therefore, $\{r_{j-k}, \ldots, r_j\}$ can be regarded as a curtailed k-RTP dipsatched by the remote node to the measuring node. Let $S_r$ denote the response packet size in bits. If none of the response packets is affected by the cross traffic on the reverse path, the unbiased packet dispersion of $\{r_{j-k}, \ldots, r_j\}$ is given by $$\delta_{j-k,j} = \max_{m+1 \leq h \leq n} \{k X^{(h)}\} = k X^{(h_r)} = k S_r / C_r. \quad \text{Equation 4}$$

Therefore, the measuring node can estimate the reverse capacity based on the unbiased $\delta_{j-k,j}$, $S_r$ and Equation 3b.

Although (v,k)-TWPs are only for measuring the reverse capacity, they provide two attractive properties. First, the reverse capacity estimation is independent of the probe packets preceding $p_u$. Such property is exploited by the present invention to use the same (v,k)-TWP to measure both forward and reverse capacities. Second, Equation 4 shows that the packet dispersion of $\{r_{j-k}, \ldots, r_j\}$ is independent of the forward dispersion. Therefore, the reverse capacity estimation is immune from the error due to the scenario 721 in FIG. 7.

Figure 10:
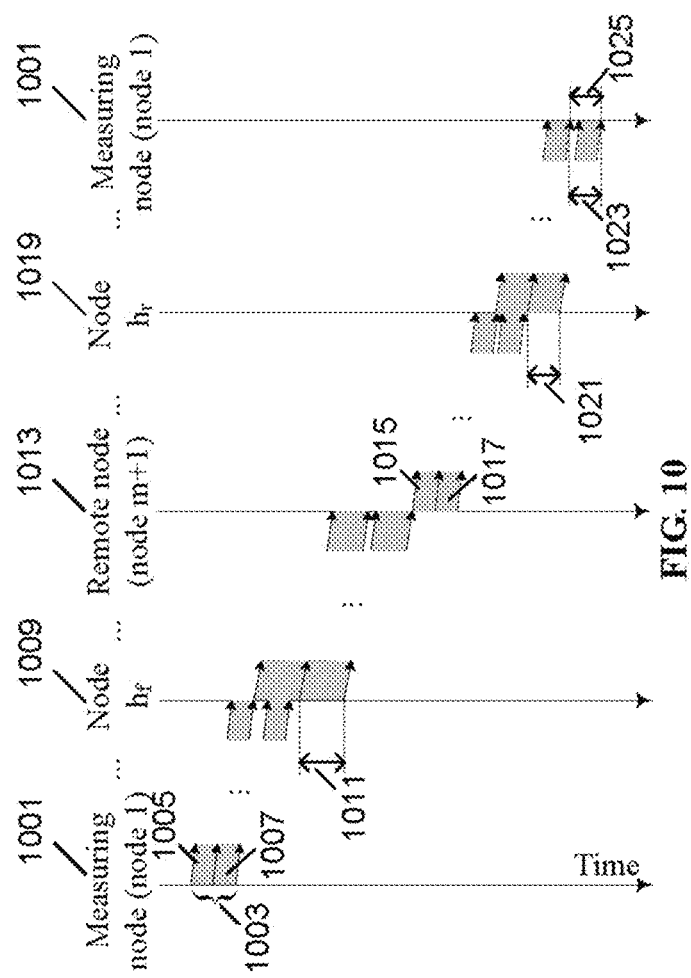
FIG. 10 is a time-line diagram illustrating an exemplary measurement session with a (1,1)-TWP to measure reverse dispersion and reverse capacity.

FIG. 10 is a time-line diagram illustrating an exemplary measurement session with a (1,1)-TWP to measure reverse dispersion and reverse capacity. For this path, the probe and response packet sizes are configured such that $C_{f/r} < S_{f/r}$. Since the (1,1)-TWP is used, a measuring node will obtain the unbiased reverse dispersion $X^{(h_r)}$ and therefore the reverse capacity according to Equations 4 and 3b. It is noted that the measuring node 1001 would underestimate the reverse capacity if the packet dispersion was obtained from a 1-RTP illustrated in FIG. 9.

An $l^{th}$ packet pair 1003 consisting of a first probe packet $p_{2l-1}$ 1005 and a second probe packet $p_{2l}$ 1007 is dispatched. The two probe packets subsequently arrive at node $h_f$ 1009 and leave the node back to back with a dispersion of $X^{(h_f)}$ 1011. The two probe packets then arrive a remote node 1013, and the second probe packet elicit two back-to-back response packets $r_{2l-1}$ 1015 and $r_{2l}$ 1017, respectively. The two response packets subsequently arrive at node $h_r$ 1019 and leave the node back to back with a dispersion of $X^{(h_r)}$ 1021. The two response packets subsequently arrive at the measuring node 1001 with a dispersion of $X^{(h_r)}$ 1023. As a result, the dispersion $\delta_{2l-1,2l}$ 1025 observed at 1001 obtains an unbiased $X^{(h_r)}$ and therefore a correct reverse capacity estimate.

The Compound Probe

In the present invention, a measuring node dispatches a sequence of compound probes, each of which consists of a 1-RTP and a (1,1)-TWP, to a remote node. To dispatch a compound probe, the measuring node first sends the 1-RTP which consists of two back-to-back probe packets $\{p_0^R, p_1^R\}$ with the probe packet size $S_f^R$. The $\{p_0^R, p_1^R\}$ subsequently elicit response packets $\{r_0^R, r_1^R\}$, respectively, from the remote node and each response packet is of size $S_r^R$. After receiving both response packets, the measuring node dispatches the (1,1)-TWP which has two back-to-back probe packets $\{p_0^T, p_1^T\}$ with the probe packet $S_f^T$. However, only $p_1^T$ elicits from the remote node two response packets $\{r_0^T, r_1^T\}$ with the response packet size $S_r^T$.

Unlike the existing packet dispersion methods, the present invention does not measure the packet dispersions of fit $\{r_0^R, r_1^R\}$ and $\{r_0^T, r_1^T\}$ for measuring forward and reverse capacities. Instead, it only obtains two round-trip time (RTT) estimates $d_{R0}$ and $d_{R1}$ for the first and second response packets of the 1-RTP and two RTT estimates $d_{T0}$ and $d_{T1}$ for the first and second response packets of the (1,1)-TWP. Moreover, all probe and response packets have an identical size of $S_f^R = S_f^T = S_r^R = S_r^T = S$. $d_{R0}$ and $d_{R1}$ are measured from the time difference between sending the first probe packet of a 1-RTP and receiving the corresponding response packets by the measuring node. Similarly, $d_{T0}$ and $d_{T1}$ are measured from the time difference between sending the first probe packet of a (1,1)-TWP and receiving the corresponding response packets. In other words, a RTT is the total delay of the corresponding probe and response packets to complete the n-node traversal from a round-trip path, which is given by $$d = \Sigma_{h=1}^{n}(X^{(h)} + T^{(h)} + w_j^{(h)}) = D^{(n)} + \Sigma_{h=1}^{n} w^{(h)}. \quad \text{Equation 5}$$

The component $D^{(n)} = \Sigma_{h=1}^{n}(X^{(h)} + T^{(h)})$ is the constant forwarding delay comprising at each node h a constant transmission delay $X^{(h)} = S/C^{(h)}$ and a constant delay of $T^{(h)}$ for propagating the packet to the next node. The component $\Sigma_{h=1}^{n} w^{(h)}$ is the total queueing delay introduced by cross traffic and the preceding packet from the same 1-RTP or (1,1)-TWP, if exists, at the head of the queue at each node h.

By using RTT instead of packet dispersion for asymmetric capacities measurement, the present invention avoids the two error scenarios 719 and 721 depicted in FIG. 7; as a result, it can measure both FF and FR paths with any degree of capacity asymmetry. Specifically, the present invention first obtains the minimum RTTs of $d_{R0}$, $d_{R1}$, $d_{T0}$ and $d_{T1}$, which are denoted by min_$d_{R0}$, min_$d_{T0}$, and respectively, from the sequence of compound probes. A minimum RTT is the RTT experienced by the probe and elicited response packets, neither of which encounters cross-traffic-induced queueing delay on the path. However, the minimum RTT can still include the queueing delay induced by the preceding packets belong to the same 1-RTP or (1,1)-TWP. By sending a sufficiently long sequence of probes, the minimum observable values of $d_{R0}$, $d_{R1}$, $d_{T0}$ and $d_{T1}$ from the sequence converge to their corresponding minimum RTTs:

$$\text{min\_d}_{R0} = D^{(n)}, \quad \text{Equation 6a}$$

$$\text{min\_d}_{R1} = D^{(n)} + \max\left\{\frac{S}{C_f}, \frac{S}{C_r}\right\}, \quad \text{Equation 6b}$$

$$\text{min\_d}_{T0} = D^{(n)} + \frac{S}{C_f}, \quad \text{Equation 6c}$$

$$\text{min\_d}_{T1} = D^{(n)} + \frac{S}{C_f} + \frac{S}{C_r}. \quad \text{Equation 6d}$$

According to Equation 5, the four minimum RTTs contain the same $D^{(n)}$ due to the fixed packet size and unique network path but different amounts of queueing delay $\Sigma_{h=1}^{n} w^{(h)}$. For min_$d_{R0}$, since the first probe and response packets $p_0^R$ and $r_0^R$ are never queued behind any packet on the round-trip path, $\Sigma_{h=1}^{n} w^{(h)}$. For min_$d_{R1}$, since the second probe and response packets $p_1^R$ and $r_1^R$ traverse all the nodes after $p_0^R$ and $r_0^R$, respectively, and none of the probe and response packets is affected by the cross traffic on the path, $$\sum_{h=1}^{n} w^{(h)} = \max_{1 \leq h \leq n} \{X^{(h)}\} = \max\left\{\frac{S}{C_f}, \frac{S}{C_r}\right\}.$$

For both min_$d_{T0}$ and min_$d_{T1}$, since $\{r_0^R, r_1^R\}$ are both elicited by $p_1^T$, their forward-path queueing delays are introduced by $p_0^T$ and equal to $$\sum_{h=1}^{m} w^{(h)} = \max_{1 \leq h \leq m} \{X^{(h)}\} = \frac{S}{C_f}.$$

Their reverse-path queueing delays are, however, different. For min_$d_{T0}$, since $r_0^T$ is never queued behind any packet on the reverse path, $\Sigma_{h=m+1}^{n} w^{(h)} = 0$. On the other hand, since $r_1^T$ traverses the reverse path after $r_0^T$, $$\sum_{h=m+1}^{n} w^{(h)} = \max_{m+1 \leq h \leq n} \{X^{(h)}\} = \frac{S}{C_r}.$$

Based on Equations 6a-6d, five minimum delay differences $\delta_{R1-R0}$, $\delta_{T0-R0}$, $\delta_{T1-R0}$, $\delta_{T1-T0}$, and $\delta_{T1-R1}$ can be obtained:

$$\delta_{R1-R0} = \min\_d_{R1} - \min\_d_{R0} = \max\left\{\frac{S}{C_f}, \frac{S}{C_r}\right\}, \quad \text{Equation 7a}$$

$$\delta_{T0-R0} = \min\_d_{T0} - \min\_d_{R0} = \frac{S}{C_f}, \quad \text{Equation 7b}$$

$$\delta_{T1-R0} = \min\_d_{T1} - \min\_d_{R0} = \frac{S}{C_f} + \frac{S}{C_r}, \quad \text{Equation 7c}$$

$$\delta_{T1-T0} = \min\_d_{T1} - \min\_d_{T0} = \frac{S}{C_r}, \quad \text{Equation 7d}$$

$$\delta_{T1-R1} = \min\_d_{T1} - \min\_d_{R1} = \min\left\{\frac{S}{C_f}, \frac{S}{C_r}\right\}, \quad \text{Equation 7e}$$

To obtain the four asymmetric capacities defined in Equations 1a-1d, the present invention uses the packet size S and the four minimum delay differences $\delta_{T0-R0}$, $\delta_{T1-T0}$, $\delta_{T1-R1}$, and $\delta_{R1-R0}$:

$$C_f = \frac{S}{\delta_{T0-R0}}, \quad \text{Equation 8a}$$

$$C_r = \frac{S}{\delta_{T1-T0}}, \quad \text{Equation 8b}$$

$$C_B = \frac{S}{\delta_{T1-R1}}, \quad \text{Equation 8c}$$

$$C_b = \frac{S}{\delta_{R1-R0}}, \quad \text{Equation 8d}$$

To verify whether the round-trip path is capacity-asymmetric or capacity-symmetric, the present invention computes Q which is given by $$Q = \log_2\left(\frac{\delta_{T1-R0}}{\delta_{R1-R0}}\right) = \log_2\left(\frac{C_f + C_r}{\max(C_f, C_r)}\right). \quad \text{Equation 9}$$

Equation 9 shows that Q fails in (0,1], where Q equals one for a capacity-symmetric path (with $C_f = C_r$) and is close to zero if $C_f \gg C_r$ (which is an FF path) or $C_f \ll C_r$ (FR path).

To estimate the degree of asymmetry $C_{f/r}$ of a round-trip path, the present invention computes $D_1$ and $D_2$ which are given by $$D_1 = \frac{\delta_{T1-T0}}{\delta_{R1-R0}} = \frac{1}{\max\left(1, \frac{C_r}{C_f}\right)} = \begin{cases} \frac{C_f}{C_r}, & C_f < C_r \\ 1, & \text{otherwise.} \end{cases} \quad \text{Equation 10a}$$

$$D_2 = \frac{\delta_{R1-R0}}{\delta_{T0-R0}} = \max\left(1, \frac{C_f}{C_r}\right) = \begin{cases} \frac{C_f}{C_r}, & C_f < C_r \\ 1, & \text{otherwise,} \end{cases} \quad \text{Equation 10b}$$

According to Equation 10a and Equation 10b, if the round-trip path is a capacity-symmetric path, both $D_1$ and $D_2$ will equal one and therefore $C_{f/r} = 1$. If the path is an FR path ($C_f < C_r$), $D_1$ will give $C_{f/r}$ which falls in (0,1) but $D_2$ will equal one. If the path is an FF path ($C_f > C_r$), $D_2$ will give $C_{f/r}$ which is greater than one but $D_1$ will equal one.

Figure 11:
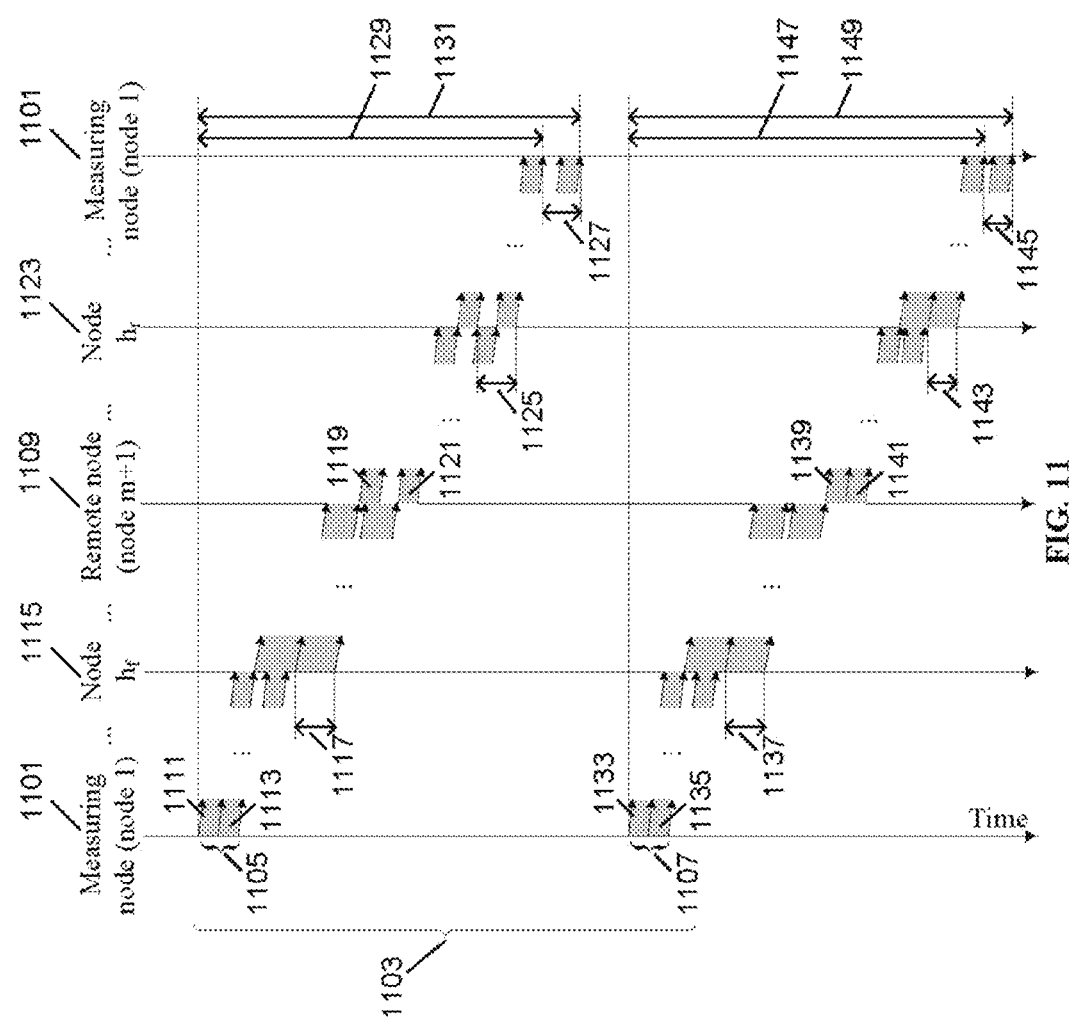
FIG. 11 is a time-line diagram illustrating an exemplary measurement session for a compound probe with a 1-RTP and a (1,1)-TWP to measure a round-trip path with $C^{(h_f)} < C^{(h_r)}$.

FIG. 11 is a time-line diagram illustrating an exemplary measurement session for a compound probe with a 1-RTP and a (1,1)-TWP to measure a round-trip path with $CC^{(h_f)} < CC^{(h_r)}$. Therefore, $X^{(h_f)} > X^{(h_r)}$ due to the identical probe and response size S for a compound probe. A measuring node 1101 sends a compound probe 1103 with a 1-RTP 1105 and a (1,1)-TWP 1107 to a remote node 1109. The 1-RTP consists of two back-to-back probe packets $p_0^R$ 1111 and $p_1^R$ 1113. The two probe packets subsequently arrive at node $h_f$ 1115 and leave the node back to back with a dispersion of $X^{(h_f)}$ 1117. The two probe packets elicit two response packets $r_0^R$ 1119 and $r_1^R$ 1121, respectively from the remote node 1109. Since $X^{(h_f)} > X^{(h_r)}$, the two response packets subsequently arrive at node $h_r$ 1123 and leave the node with a dispersion of $X^{(h_f)}$ 1125. The two response packets eventually arrive at the measuring node 1101 with a dispersion of $X^{(h_f)}$ 1127. Because the probe and response packets traverse the path without experiencing any cross-traffic induced delay at each node, the RTT 1129 measured by 1101 will follow Equation 6a and give min_$d_{R0}$ which consists of only the total forwarding delay $D^{(n)}$ for the probe and response packets $p_0^R$ and $r_0^R$. Moreover, the RTT 1131 measured by 1101 will follow Equation 6b and give min_$d_{R1}$ which contains both the total forwarding delay $D^{(n)}$ and the forward-path queueing delay $X^{(h_r)}$ introduced by $p_0^R$.

The measuring node 1101 dispatches a (1,1)-TWP 1107 consisting of two back-to-back probe packets $p_0^T$ 1133 and $p_1^T$ 1135 after receiving $r_0^R$ and $r_1^R$. The two probe packets subsequently arrive at node $h_f$ 1115 and leave the node back to back with a dispersion of $X^{(h_f)}$ 1137. The two probe packets then arrive a remote node 1109, and the second probe packet elicit two back-to-back response packets $r_0^T$ 1139 and if $r_1^T$ 1141, respectively. The two response packets subsequently arrive at node $h_r$ 1123 and leave the node back to back with a dispersion of $X^{(h_r)}$ 1143. The two response packets subsequently arrive at the measuring node 1101 with a dispersion of $X^{(h_r)}$ 1145. As a result, the RTT 1147 measured by 1101 will follow Equation 6c and give min_$d_{T0}$ because it contains both the total forwarding delay $D^{(n)}$ and the forward-path queueing delay $X^{(h_f)}$ introduced by $p_0^T$. Moreover, the RTT 1149 measured by 1101 will follow Equation 6d and give min_$d_{T1}$ because, comparing with min_$d_{T0}$, it additionally contains the reverse-path queueing delay $X^{(h_r)}$ introduced by $r_0^T$. With the four minimum RTT estimates, the measuring node can obtain the four asymmetric capacities of the round-trip path from Equations 8a-8d, verify if the path is capacity-asymmetric by computing Q according to Equation 9, and estimate the degree of capacity asymmetry by computing $D_1$ and $D_2$ according to Equations 10a and 10b.

Figure 12:
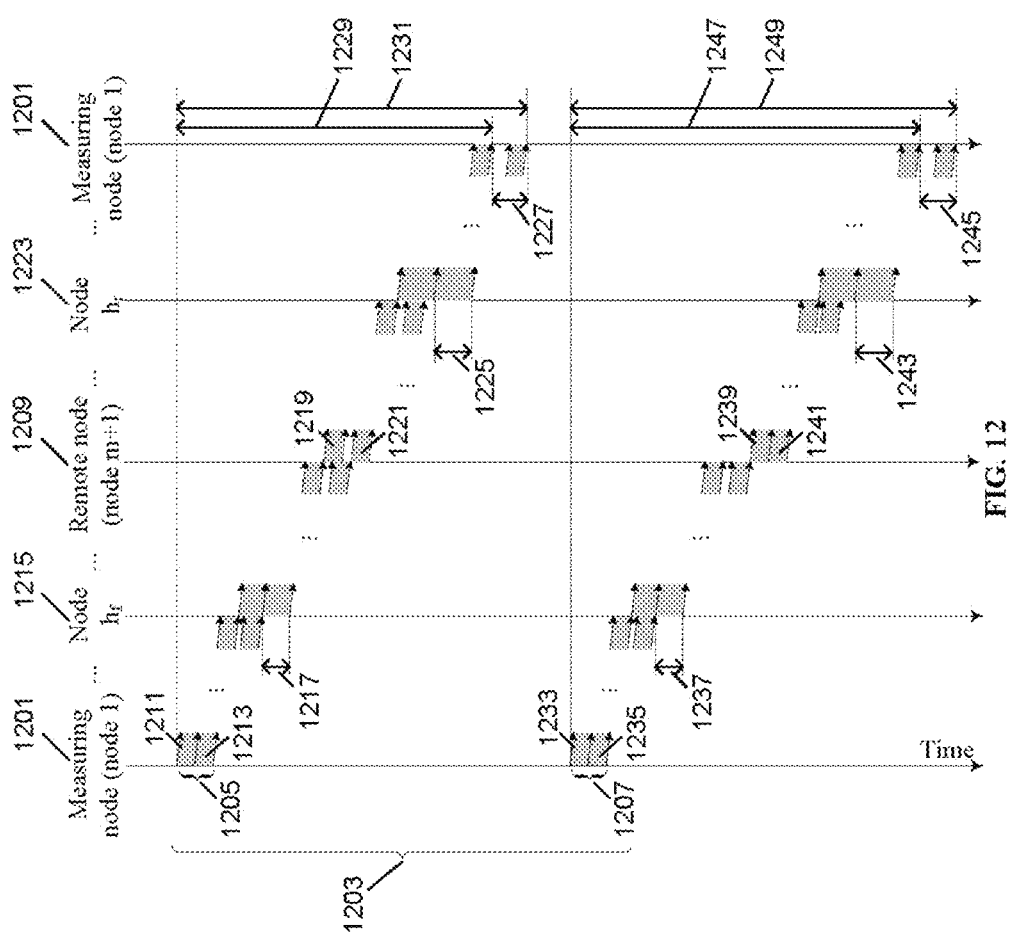
FIG. 12 is a time-line diagram illustrating an exemplary measurement session for a compound probe with a 1-RTP and a (1,1)-TWP to measure a round-trip path with $C^{(h_f)} > C^{(h_r)}$.

FIG. 12 is a time-line diagram illustrating an exemplary measurement session for a compound probe with a 1-RTP and a (1,1)-TWP to measure a round-trip path with $C^{(h_f)} > C^{(h_r)}$. Therefore, $X^{(h_f)} < X^{(h_r)}$ due to the identical probe and response size S for a compound probe. A measuring node 1201 sends a compound probe 1203 with a 1-RTP 1205 and a (1,1)-TWP 1207 to a remote node 1209. The 1-RTP consists of two back-to-back probe packets $p_0^R$ 1211 and $p_1^R$ 1213. The two probe packets subsequently arrive at node $h_f$ 1215 and leave the node back to back with a dispersion of $X^{(h_f)}$ 1217. The two probe packets elicit two response packets $r_0^R$ 1219 and $r_1^R$ 1221, respectively from the remote node 1109. Since $X^{(h_f)} < X^{(h_r)}$, the two response packets subsequently arrive at node $h_r$ 1223 and leave the node with a dispersion of $X^{(h_r)}$ 1225. The two response packets eventually arrive at the measuring node 1201 with a dispersion of $X^{(h_r)}$ 1227. Because the probe and response packets traverse the path without experiencing any cross-traffic induced delay at each node, the RTT 1229 measured by 1201 will follow Equation 6a and give min_$d_{R0}$ which consists of only the total forwarding delay $D^{(n)}$ for the probe and response packets $p_0^R$ and $p_0^R$. Moreover, the RTT 1231 measured by 1201 will follow Equation 6b and give min_$d_{R1}$ which contains both the total forwarding delay $D^{(n)}$ and the reverse-path queueing delay $X^{(h_r)}$ introduced by $r_0^R$.

The measuring node 1201 dispatches a (1,1)-TWP 1207 consisting of two back-to-back probe packets $p_0^T$ 1233 and $p_1^T$ 1235 after receiving $r_0^R$ and $r_1^R$. The two probe packets subsequently arrive at node $h_f$ 1215 and leave the node back to back with a dispersion of $X^{(h_f)}$ 1237. The two probe packets then arrive a remote node 1209, and the second probe packet elicit two back-to-back response packets $r_0^T$ 1239 and $r_1^T$ 1241, respectively. The two response packets subsequently arrive at node $h_r$ 1223 and leave the node back to back with a dispersion of $X^{(h_r)}$ 1243. The two response packets subsequently arrive at the measuring node 1201 with a dispersion of $X^{(h_r)}$ 1245. As a result, the RTT 1247 measured by 1201 will follow Equation 6c and give min_$d_{T0}$ because it contains both the total forwarding delay $D^{(n)}$ and the forward-path queueing delay $X^{(h_f)}$ introduced by $p_0^T$. Moreover, the RTT 1249 measured by 1201 will follow Equation 6d and give min_$d_{T1}$ because, comparing with min_$d_{T0}$, it additionally contains the reverse-path queueing delay $X^{(h_r)}$ introduced by $r_0^T$. With the four minimum RTT estimates, the measuring node can obtain the four asymmetric capacities of the round-trip path from Equations 8a-8d, verify if the path is capacity-asymmetric by computing Q according to Equation 9, and estimate the degree of capacity asymmetry by computing $D_1$ and $D_2$ according to Equations 10a and 10b.

Exemplary Probe and Response Data Packets

In the present invention, a measuring node can perform client-side or server-side measurement to a remote node. The client-side measurement facilitates the measuring node to conduct the measurement to a remote web server. Each probe packet of a 1-RTP or (1,1)-TWP is a TCP data packet which carries a legitimate HTTP GET request; each corresponding response packet is a TCP data packet elicited from a remote web server which contains the requested HTTP data. The server-side measurement, on the other hand, enables the measurement to a remote web client. The measuring node serving as a web server listens to incoming HTTP requests from a web browser of the remote web client. Upon receiving an HTTP request from the web browser, the measuring node replies with an HTTP response that instructs the web browser to download a Flash object from the measuring node. The web browser subsequently loads the Flash object which establishes a separate TCP connection with the measuring node for asymmetric capacities measurement.

Figure 13:
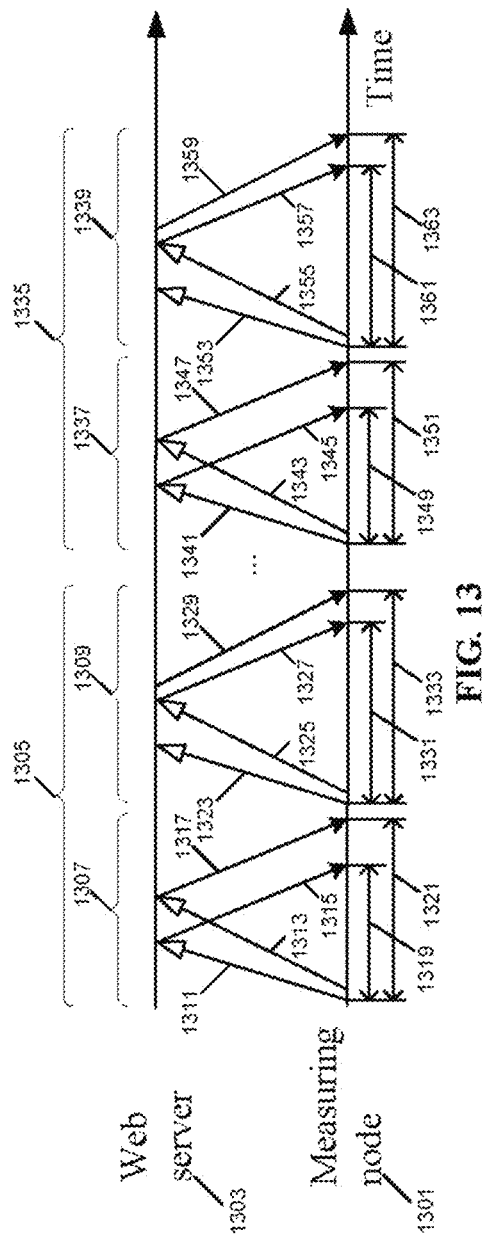
FIG. 13 is a time-line diagram illustrating a remote web server's responses to receiving each probe HTTP/TCP data packet in a compound probe from a measuring node in a particular embodiment according to the present invention.

FIG. 13 is a time-line diagram illustrating a remote web server's responses to receiving each probe HTTP/TCP data packet in a compound probe from a measuring node in a particular embodiment according to the present invention. After a measuring node 1301 established a TCP connection with a web server 1303, the measuring node 1301 dispatches a sequence of sufficiently spaced compound probes to the web server 1303. A $k^{th}$ compound probe 1305 consisting of a 1-RTP 1307 and a (1,1)-TWP 1309. The measuring node 1301 first sends the 1-RTP 1307 comprising two back-to-back HTTP/TCP data packets $p_{2k-2}^R$ 1311 and $p_{2k-1}^R$ 1313 to the web server 1303. The first probe packet $p_{2k-2}^R$ 1311 elicits a response HTTP/TCP data packet $r_{2k-2}^R$ 1315 from the web server 1303, whereas the second probe packet $p_{2k-1}^R$ 1313 elicits a response HTTP/TCP data packet $r_{2k-1}^R$ 1317 from the web server 1303. Upon receiving $r_{2k-2}^R$ 1315, the measuring node 1301 measures $d_{R(2k-2)}$ 1319 and updates the minimum RTT min_$d_{R0}$ according to FIG. 4. Upon receiving $r_{2k-1}^R$ 1317, the measuring node 1301 measures $d_{R(2k-1)}$ 1321 and updates the minimum RTT min_$d_{R1}$ according to FIG. 4.

After receiving $r_{2k-2}^R$ 1315 and $r_{2k-1}^R$ 1317, the measuring node 1301 sends the (1,1)-TWP comprising two back-to-back HTTP/TCP data packets $p_{2k-2}^T$ 1323 and $p_{2k-1}^T$ 1325 to the web server 1303. The arrival of the second probe packet $p_{2k-1}^T$ 1325 elicits two back-to-back response HTTP/TCP data packet $r_{2k-2}^T$ 1327 and $r_{2k-1}^T$ 1329 from the web server 1303. Upon receiving $r_{2k-2}^T$ 1327, the measuring node 1301 measures $d_{T(2k-2)}$ 1331 and updates the minimum RTT min_$d_{T0}$ according to FIG. 4. Upon receiving $r_{2k-1}^T$ 1329, the measuring node 1301 measures $d_{T(2k-1)}$ 1333 and updates the minimum RTT min_$d_{T1}$ according to FIG. 4.

An $l^{th}$ compound probe 1335 consisting of a 1-RTP 1337 and a (1,1)-TWP 1339. The measuring node 1301 sends the 1-RTP 1337 comprising two back-to-back HTTP/TCP data packets $p_{2l-2}^R$ 1341 and $p_{2l-2}^R$ 1343 to the web server 1303. The first probe packet $p_{2l-2}^R$ 1341 elicits a response HTTP/TCP data packet $r_{2l-2}^R$ 1345 from the web server 1303, whereas the second probe packet $p_{2l-1}^R$ 1343 elicits a response HTTP/TCP data packet $r_{2l-1}^R$ 1347 from the web server 1303. Upon receiving $r_{2l-2}^R$ 1345, the measuring node 1301 measures $d_{R(2l-2)}$ 1349 and updates the minimum RTT min_$d_{R0}$ according to FIG. 4. Upon receiving $r_{2l-1}^R$ 1347, the measuring node 1301 measures $d_{R(2l-1)}$ 1351 and updates the minimum RTT min_$d_{R1}$ according to FIG. 4.

After receiving $r_{2l-2}^R$ 1345 and $r_{2l-1}^R$ 1347, the measuring node sends the (1,1)-TWP comprising two back-to-back HTTP/TCP data packets $p_{2l-2}^{T}$ 1353 and $p_{2l-1}^{T}$ 1355 to the web server 1303. The arrival of the second probe packet $p_{2l-1}^{T}$ 1355 elicits two back-to-back response HTTP/TCP data packet $r_{2l-2}^{T}$ 1357 and $r_{2l-1}^{T}$ 1359 from the web server 1303. Upon receiving $r_{2l-2}^{T}$ 1357, the measuring node 1301 measures $d_{T(2l-2)}$ 1361 and updates the minimum RTT min_$d_{T0}$ according to FIG. 4. Upon receiving $r_{2l-1}^{T}$ 1359, the measuring node 1301 measures $d_{T(2l-1)}$ 1363 and updates the minimum RTT min_$d_{T1}$ according to FIG. 4.

Table 1 shows, as an example, the structure of the probe and response HTTP/TCP packets (including the TCP header and TCP payload, and each row contains a 32-bit word). Other elements belonging to the lower layer of the protocol stack (such as, the IP header, and Ethernet header and trailer) are excluded, because they are not directly related to the exemplary embodiment.

TABLE 1

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          Source Port          |       Destination Port        |
+-+-+-+-+-+-+-+-+-+-+-+-+-+-+-+-+-+-+-+-+-+-+-+-+-+-+-+-+-+-+-+-+
|                        Sequence Number                        |
+-+-+-+-+-+-+-+-+-+-+-+-+-+-+-+-+-+-+-+-+-+-+-+-+-+-+-+-+-+-+-+-+
|                     Acknowledgment Number                     |
+-+-+-+-+-+-+-+-+-+-+-+-+-+-+-+-+-+-+-+-+-+-+-+-+-+-+-+-+-+-+-+-+
| Data  | Reserv- | C | E | U | A | P | R | S | F |             |
| Offset| ed      | W | U | R | C | S | S | Y | I |  Window Size|
|       |         | R | N | G | K | H | T | N | N |             |
+-+-+-+-+-+-+-+-+-+-+-+-+-+-+-+-+-+-+-+-+-+-+-+-+-+-+-+-+-+-+-+-+
|           Checksum            |        Urgent Pointer         |
+-+-+-+-+-+-+-+-+-+-+-+-+-+-+-+-+-+-+-+-+-+-+-+-+-+-+-+-+-+-+-+-+
|                           HTTP Data                           |
+-+-+-+-+-+-+-+-+-+-+-+-+-+-+-+-+-+-+-+-+-+-+-+-+-+-+-+-+-+-+-+-+
```

For the case of 1-RTP through an HTTP/TCP connection, the actual content of exemplary probe and response packets is illustrated in Tables 2-5.

Table 2 is the first probe packet pR of a 1-RTP (with a 240-byte TCP data payload):

TABLE 2

| Fields | Value (in decimal) |
| --- | --- |
| Source Port | 11949 |
| Destination Port | 80 |
| Sequence Number | 1649735825 |
| Acknowledgement Number | 418938821 |
| Data Offset | 5 |
| Reserved | 0 |
| CWR | 0 |
| ECN | 0 |
| URG | 0 |
| ACK | 1 |
| PSH | 1 |
| RST | 0 |
| SYN | 0 |
| FIN | 0 |
| Window Size | 480 |
| Checksum | 8357 |
| HTTP Data | GET /test1.txt HTTP/1.1\r\nHost: www.oneprobe.org\r\nUser-Agent: OneProbe/0.1\r\nAccept: */*\r\nConnection: keep-alive\r\nReferer: http://www.oneprobe.org/?s=04094161792100000004000000040OneProbe0Measurement0OneProbe0Measurement0OneProbe0Measurem\r\n\r\n |

Table 3 is the second probe packet $p_1^R$ of a 1-RTP (with a 240-byte TCP data payload):

TABLE 3

| Fields | Value (in decimal) |
| --- | --- |
| Source Port | 11949 |
| Destination Port | 80 |
| Sequence Number | 1649736065 |
| Acknowledgement Number | 418939061 |

TABLE 3-continued

| Fields | Value (in decimal) |
|---|---|
| Data Offset | 5 |
| Reserved | 0 |
| CWR | 0 |
| ECN | 0 |
| URG | 0 |
| ACK | 1 |
| PSH | 1 |
| RST | 0 |
| SYN | 0 |
| FIN | 0 |
| Window Size | 480 |
| Checksum | 7876 |
| HTTP Data | GET /test2.txt HTTP/1.1\r\nHost: www.oneprobe.org\r\nUser-Agent: OneProbe/0.1\r\nAccept: */*\r\nConnection: keep-alive\r\nReferer: http://www.oneprobe.org/?s=040941617921000000040000000040OneProbe0Measurement0OneProbe0Measurement0OneProbe0Measurem\r\n\r\n |

Table 4 is the first response packet $r_0^R$ of a 1-RTP (with a 240-byte TCP data payload):

TABLE 4

| Fields | Value (in decimal) |
|---|---|
| Source Port | 80 |
| Destination Port | 11949 |
| Sequence Number | 418939061 |
| Acknowledgement Number | 1649736065 |
| Data Offset | 5 |
| Reserved | 0 |
| CWR | 0 |
| ECN | 0 |
| URG | 0 |
| ACK | 1 |
| PSH | 1 |
| RST | 0 |
| SYN | 0 |
| FIN | 0 |
| Window Size | 49200 |
| Checksum | 46172 |
| HTTP Data | 01234567890123456789012345678901234567890123456789012345678901234567890123456789012345678901234567890123456789012345678901234567890123456789012345678901234567890123456789012345678901234567890123456789012345678901234567890123456789 |

Table 5 is the second response packet $r_1^R$ of a 1-RTP (with a 240-byte TCP data payload):

TABLE 5

| Fields | Value (in decimal) |
|---|---|
| Source Port | 80 |
| Destination Port | 11949 |
| Sequence Number | 418939301 |
| Acknowledgement Number | 1649736305 |
| Data Offset | 5 |
| Reserved | 0 |
| CWR | 0 |
| ECN | 0 |
| URG | 0 |
| ACK | 1 |
| PSH | 1 |
| RST | 0 |
| SYN | 0 |
| FIN | 0 |
| Window Size | 49200 |
| Checksum | 59235 |
| HTTP Data | 0123456789012345678901234567890123456789012345678901234567890123456789012345678901234567890123456789012345678901234567890123 |

TABLE 5-continued

| Fields | Value (in decimal) |
|---|---|
| 45678901234567890123456789012345678901234567890123456789012345678901234567890123456789 | |

For the case of (1,1)-TWP through an HTTP/TCP connection, the actual content of exemplary probe and response packets is illustrated in Tables 6-9.

Table 6 is the first probe packet $p_0^T$ of a (1,1)-TWP (with a 240-byte TCP data payload):

TABLE 6

| Fields | Value (in decimal) |
|---|---|
| Source Port | 11949 |
| Destination Port | 80 |
| Sequence Number | 1649736305 |
| Acknowledgement Number | 418939301 |
| Data Offset | 5 |
| Reserved | 0 |
| CWR | 0 |
| ECN | 0 |
| URG | 0 |
| ACK | 1 |
| PSH | 1 |
| RST | 0 |
| SYN | 0 |
| FIN | 0 |
| Window Size | 0 |
| Checksum | 8357 |
| HTTP Data | GET /test1.txt HTTP/1.1\r\nHost: www.oneprobe.org\r\nUser-Agent: OneProbe/0.1\r\nAccept: */*\r\nConnection: keep-alive\r\nReferer: http://www.oneprobe.org/?s=04094161792100000004000000040OneProbe0Measurement0OneProbe0Measurement0OneProbe0Measurem\r\n\r\n |

Table 7 is the second probe packet $p_1^T$ of a (1,1)-TWP (with a 240-byte TCP data payload):

TABLE 7

| Fields | Value (in decimal) |
|---|---|
| Source Port | 11949 |
| Destination Port | 80 |
| Sequence Number | 1649736545 |
| Acknowledgement Number | 418939541 |
| Data Offset | 5 |
| Reserved | 0 |
| CWR | 0 |
| ECN | 0 |
| URG | 0 |
| ACK | 1 |
| PSH | 1 |
| RST | 0 |
| SYN | 0 |
| FIN | 0 |
| Window Size | 480 |
| Checksum | 8357 |
| HTTP Data | GET /test1.txt HTTP/1.1\r\nHost: www.oneprobe.org\r\nUser-Agent: OneProbe/0.1\r\nAccept: */*\r\nConnection: keep-alive\r\nReferer: http://www.oneprobe.org/?s=04094161792100000004000000040OneProbe0Measurement0OneProbe0Measurement0OneProbe0Measurem\r\n\r\n |

Table 8 is the first response packet $r_0^T$ of a (1,1)-TWP (with a 240-byte TCP data payload):

TABLE 8

| Fields | Value (in decimal) |
|---|---|
| Source Port | 80 |
| Destination Port | 11949 |
| Sequence Number | 418939541 |
| Acknowledgement Number | 1649736785 |
| Data Offset | 5 |
| Reserved | 0 |
| CWR | 0 |
| ECN | 0 |
| URG | 0 |
| ACK | 1 |
| PSH | 1 |
| RST | 0 |
| SYN | 0 |
| FIN | 0 |
| Window Size | 49200 |
| Checksum | 46172 |
| HTTP Data 01234567890123456789012345678901234567890123456789012345678901234567890123456789012345678901234567890123456789012345678901234567890123456789012345678901234567890123456789012345678901234567890123456789012345678901234567890123456789 | |

Table 9 is the second response packet $r_1^T$ if of a (1,1)-TWP (with a 240-byte TCP data payload):

TABLE 9

| Fields | Value (in decimal) |
|---|---|
| Source Port | 80 |
| Destination Port | 11949 |
| Sequence Number | 418939781 |
| Acknowledgement Number | 1649736785 |
| Data Offset | 5 |
| Reserved | 0 |
| CWR | 0 |
| ECN | 0 |
| URG | 0 |
| ACK | 1 |
| PSH | 1 |
| RST | 0 |
| SYN | 0 |
| FIN | 0 |
| Window Size | 49200 |
| Checksum | 46172 |
| HTTP Data 01234567890123456789012345678901234567890123456789012345678901234567890123456789012345678901234567890123456789012345678901234567890123456789012345678901234567890123456789012345678901234567890123456789012345678901234567890123456789 | |

Figure 14:
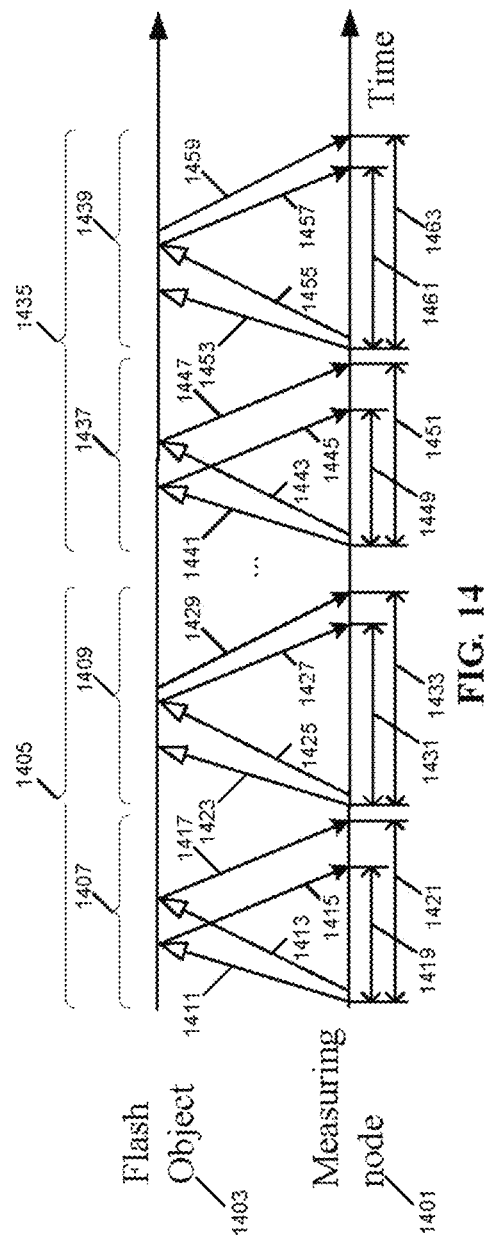
FIG. 14 is a time-line diagram illustrating Flash object's responses of a remote web client to receiving each probe Flash/TCP data packet in a compound probe from a measuring node in a particular embodiment according to the present invention.

FIG. 14 is a time-line diagram illustrating Flash object's responses of a remote web client to receiving each probe Flash/TCP data packet in a compound probe from a measuring node in a particular embodiment according to the present invention. After a Flash object 1403 loaded by a remote web client's browser established a TCP connection with a measuring node 1401, the measuring node 1401 dispatches a sequence of sufficiently spaced compound probes to the Flash object 1403. A $k^{th}$ compound probe 1405 consisting of a 1-RTP 1407 and a (1,1)-TWP 1409. The measuring node 1301 first sends the 1-RTP 1407 comprising two back-to-back Flash/TCP data packets $p_{2k-2}^R$ 1411 and $p_{2k-1}^R$ 1413 to the Flash object 1403. The first probe packet $p_{2k-2}^R$ 1411 elicits a response Flash/TCP data packet $r_{2k-2}^R$ 1415 from the Flash object 1403, whereas the second probe packet $p_{2k-1}^R$ 1413 elicits a response Flash/TCP data packet $r_{2k-1}^R$ 1417 from the Flash object 1403. Upon receiving $r_{2k-2}^R$ 1415, the measuring node 1401 measures $d_{R(2k-2)}$ 1419 and updates the minimum RTT min_$d_{R0}$ according to FIG. 4. Upon receiving $r_{2k-1}^R$ 1417, the measuring node 1401 measures $d_{R(2k-1)}$ 1421 and updates the minimum RTT min_$d_{R1}$ according to FIG. 4.

After receiving $r_{2k-2}^R$ 1415 and $r_{2k-1}^R$ 1417, the measuring node 1401 sends the (1,1)-TWP comprising two back-to-back Flash/TCP data packets $p_{2k-2}^T$ 1423 and $p_{2k-1}^T$ 1425 to the Flash object 1403. The arrival of the second probe packet $p_{2k-1}^T$ 1425 elicits two back-to-back response Flash/TCP data packet $r_{2k-2}^R$ 1427 and $r_{2k-1}^T$ 1429 from the Flash object 1403. Upon receiving $r_{2k-2}^T$ 1427, the measuring node 1401 measures $d_{T(2k-2)}$ 1431 and updates the minimum RTT min_$d_{T0}$ according to FIG. 4. Upon receiving $r_{2k-1}^T$ 1429, the measuring node 1401 measures $d_{T(2k-1)}$ 1433 and updates the minimum RTT min_$d_{T1}$ according to FIG. 4.

An $l^{th}$ compound probe 1435 consisting of a 1-RTP 1437 and a (1,1)-TWP 1439. The measuring node 1401 sends the 1-RTP 1437 comprising two back-to-back Flash/TCP data packets $p_{2l-2}^T$ 1441 and $p_{2l-2}^R$ 1443 to the Flash object 1403. The first probe packet $p_{2l-2}^R$ 1441 elicits a response Flash/TCP data packet $r_{2l-2}^R$ 1445 from the Flash object 1403, whereas the second probe packet $p_{2l-2}^R$ 1443 elicits a response Flash/TCP data packet $r_{2l-1}^R$ 1447 from the Flash object 1403. Upon receiving $r_{2l-2}^R$ 1445, the measuring node 1401 measures $d_{R(2l-2)}$ 1449 and updates the minimum RTT min_$d_{R0}$ according to FIG. 4. Upon receiving $r_{2l-1}^R$ 1447, the measuring node 1401 measures $d_{R(2l-1)}$ 1451 and updates the minimum RTT min_$d_{R1}$ according to FIG. 4.

After receiving $r_{2l-2}^R$ 1445 and $r_{2l-1}^R$ 1447, the measuring node 1401 sends the (1,1)-TWP comprising two back-to-back Flash/TCP data packets $p_{2l-2}^T$ 1453 and IDT, 1455 to the Flash object 1403. The arrival of the second probe packet $p_{2l-1}^T$ 1455 elicits two back-to-back response Flash/TCP data packet $r_{2l-2}^T$ 1457 and $r_{2l-1}^T$ 1459 from the Flash object 1403.

Upon receiving $r_{2l-2}^T$ 1457, the measuring node 1401 measures $d_{T(2l-2)}$ 1461 and updates the minimum RTT min_$d_{T0}$ according to FIG. 4. Upon receiving $r_{2l-1}^T$ 1459, the measuring node 1401 measures $d_{T(2l-1)}$ 1463 and updates the minimum RTT min_$d_{T1}$ according to FIG. 4.

Table 10 shows, as an example, the structure of the probe and response Flash/TCP data packets (including the TCP header and TCP payload, and each row contains a 32-bit word). Other elements belonging to the lower layer of the protocol stack (such as, the IP header, and Ethernet header and trailer) are excluded, because they are not directly related to the exemplary embodiment.

TABLE 10

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          Source Port          |        Destination Port       |
+-+-+-+-+-+-+-+-+-+-+-+-+-+-+-+-+-+-+-+-+-+-+-+-+-+-+-+-+-+-+-+-+
|                        Sequence Number                        |
+-+-+-+-+-+-+-+-+-+-+-+-+-+-+-+-+-+-+-+-+-+-+-+-+-+-+-+-+-+-+-+-+
|                     Acknowledgment Number                     |
+-+-+-+-+-+-+-+-+-+-+-+-+-+-+-+-+-+-+-+-+-+-+-+-+-+-+-+-+-+-+-+-+
|  Data | Reserv- |C|E|U|A|P|R|S|F|                             |
| Offset| ed      |W|C|R|C|S|S|Y|I|         Window Size         |
|       |         |R|N|G|K|H|T|N|N|                             |
+-+-+-+-+-+-+-+-+-+-+-+-+-+-+-+-+-+-+-+-+-+-+-+-+-+-+-+-+-+-+-+-+
|           Checksum            |        Urgent Pointer         |
+-+-+-+-+-+-+-+-+-+-+-+-+-+-+-+-+-+-+-+-+-+-+-+-+-+-+-+-+-+-+-+-+
|                           Flash Data                          |
+-+-+-+-+-+-+-+-+-+-+-+-+-+-+-+-+-+-+-+-+-+-+-+-+-+-+-+-+-+-+-+-+
```

For the case of 1-RTP through a Flash/TCP connection, the actual content of exemplary probe and response packets is illustrated in Tables 11-14.

Table 11 is the first probe packet $p_0^R$ of a 1-RTP (with a 240-byte TCP data payload):

TABLE 11

| Fields | Value (in decimal) |
| --- | --- |
| Source Port | 11949 |
| Destination Port | 80 |
| Sequence Number | 1649735825 |
| Acknowledgement Number | 418938821 |
| Data Offset | 5 |
| Reserved | 0 |
| CWR | 0 |
| ECN | 0 |
| URG | 0 |
| ACK | 1 |
| PSH | 1 |
| RST | 0 |
| SYN | 0 |
| FIN | 0 |
| Window Size | 480 |
| Checksum | 8357 |
| Flash Data | 01234567890123456789012345678901234567890123456789012345678901234567890123456789012345678901 23456789012345678901234567890123456789012345678901234567890123456789012345678901234567890123 45678901234567890123456789012345678901234567890123456789012345678901234567890123456789012345 6789012345678901234567890123456789 |

Table 12 is the second probe packet $p_1^R$ of a 1-RTP (with a 240-byte TCP data payload):

TABLE 12

| Fields | Value (in decimal) |
|---|---|
| Source Port | 11949 |
| Destination Port | 80 |
| Sequence Number | 1649736065 |
| Acknowledgement Number | 418939061 |
| Data Offset | 5 |
| Reserved | 0 |
| CWR | 0 |
| ECN | 0 |
| URG | 0 |
| ACK | 1 |
| PSH | 1 |
| RST | 0 |
| SYN | 0 |
| FIN | 0 |
| Window Size | 480 |
| Checksum | 7876 |
| Flash Data 012345678901234567890123456789012345678901234567890123456789012345678901 234567890123456789012345678901234567890123456789012345678901234567890123 456789012345678901234567890123456789012345678901234567890123456789012345 67890123456789012345 6789 | |

Table 13 is the first response packet $r_0^R$ of a 1-RTP (with a 240-byte TCP data payload):

TABLE 13

| Fields | Value (in decimal) |
|---|---|
| Source Port | 80 |
| Destination Port | 11949 |
| Sequence Number | 418939061 |
| Acknowledgement Number | 1649736065 |
| Data Offset | 5 |
| Reserved | 0 |
| CWR | 0 |
| ECN | 0 |
| URG | 0 |
| ACK | 1 |
| PSH | 1 |
| RST | 0 |
| SYN | 0 |
| FIN | 0 |
| Window Size | 49200 |
| Checksum | 46172 |
| Flash Data 012345678901234567890123456789012345678901234567890123456789012345678901 234567890123456789012345678901234567890123456789012345678901234567890123 456789012345678901234567890123456789012345678901234567890123456789012345 67890123456789012345 6789 | |

Table 14 is the second response packet $r_1^R$ of a 1-RTP (with a 240-byte TCP data payload):

TABLE 14

| Fields | Value (in decimal) |
|---|---|
| Source Port | 80 |
| Destination Port | 11949 |
| Sequence Number | 418939301 |
| Acknowledgement Number | 1649736305 |
| Data Offset | 5 |
| Reserved | 0 |
| CWR | 0 |
| ECN | 0 |
| URG | 0 |
| ACK | 1 |
| PSH | 1 |
| RST | 0 |

TABLE 14-continued

| Fields | Value (in decimal) |
|---|---|
| SYN | 0 |
| FIN | 0 |
| Window Size | 49200 |
| Checksum | 59235 |
| Flash Data | |
| 01234567890123456789012345678901234567890123456789012345678901 2345678901234567890123456789012345678901234567890123456789012 3 4567890123456789012345678901234567890123456789012345678901234 5 67890123456789012345678 9 | |

For the case of (1,1)-TWP through a Flash/TCP connection, the actual content of exemplary probe and response packets is illustrated in Tables 15-18.

Table 15 is the first probe packet $p_0^T$ of a (1,1)-TWP (with a 240-byte TCP data payload):

TABLE 15

| Fields | Value (in decimal) |
|---|---|
| Source Port | 11949 |
| Destination Port | 80 |
| Sequence Number | 1649736305 |
| Acknowledgement Number | 418939301 |
| Data Offset | 5 |
| Reserved | 0 |
| CWR | 0 |
| ECN | 0 |
| URG | 0 |
| ACK | 1 |
| PSH | 1 |
| RST | 0 |
| SYN | 0 |
| FIN | 0 |
| Window Size | 0 |
| Checksum | 8357 |
| Flash Data | |
| 01234567890123456789012345678901234567890123456789012345678901 2345678901234567890123456789012345678901234567890123456789012 3 4567890123456789012345678901234567890123456789012345678901234 5 67890123456789012345678 9 | |

Table 16 is the second probe packet $p_1^T$ of a (1,1)-TWP (with a 240-byte TCP data payload):

TABLE 16

| Fields | Value (in decimal) |
|---|---|
| Source Port | 11949 |
| Destination Port | 80 |
| Sequence Number | 1649736545 |
| Acknowledgement Number | 418939541 |
| Data Offset | 5 |
| Reserved | 0 |
| CWR | 0 |
| ECN | 0 |
| URG | 0 |
| ACK | 1 |
| PSH | 1 |
| RST | 0 |
| SYN | 0 |
| FIN | 0 |
| Window Size | 480 |
| Checksum | 8357 |
| Flash Data | |
| 01234567890123456789012345678901234567890123456789012345678901 2345678901234567890123456789012345678901234567890123456789012 3 4567890123456789012345678901234567890123456789012345678901234 5 67890123456789012345678 9 | |

Table 17 is the first response packet $r_0^T$ of a (1,1)-TWP (with a 240-byte TCP data payload):

TABLE 17

| Fields | Value (in decimal) |
|---|---|
| Source Port | 80 |
| Destination Port | 11949 |
| Sequence Number | 418939541 |
| Acknowledgement Number | 1649736785 |
| Data Offset | 5 |
| Reserved | 0 |
| CWR | 0 |
| ECN | 0 |
| URG | 0 |
| ACK | 1 |
| PSH | 1 |
| RST | 0 |
| SYN | 0 |
| FIN | 0 |
| Window Size | 49200 |
| Checksum | 46172 |
| Flash Data 0123456789012345678901234567890123456789012345678901234567890123456789012345678901 2345678901234567890123456789012345678901234567890123456789012345678901234567890123 4567890123456789012345678901234567890123456789012345678901234567890123456789012345 67890123456789012345678 | |

Table 18 is the second response packet $r_1^T$ of a (1,1)-TWP (with a 240-byte TCP data payload):

TABLE 18

| Fields | Value (in decimal) |
|---|---|
| Source Port | 80 |
| Destination Port | 11949 |
| Sequence Number | 418939781 |
| Acknowledgement Number | 1649736785 |
| Data Offset | 5 |
| Reserved | 0 |
| CWR | 0 |
| ECN | 0 |
| URG | 0 |
| ACK | 1 |
| PSH | 1 |
| RST | 0 |
| SYN | 0 |
| FIN | 0 |
| Window Size | 49200 |
| Checksum | 46172 |
| Flash Data 0123456789012345678901234567890123456789012345678901234567890123456789012345678901 2345678901234567890123456789012345678901234567890123456789012345678901234567890123 4567890123456789012345678901234567890123456789012345678901234567890123456789012345 67890123456789012345678 | |

Exemplary Computing Environment

The method for the present invention is operational with numerous other general-purpose or special-purpose computing system environments or configurations. Examples of well-known computing systems, environments, and/or configurations that may be suitable for practicing the present invention include, but are not limited to, personal computers, server computers, thin clients, thick clients, hand-held or laptop devices, multiprocessor systems, microprocessor-based systems, set top boxes, programmable consumer electronics, wireless phone, wireless communication devices, network PCs, minicomputers, mainframe computers, distributed computing environments that include any of the above systems or devices, and the like.

The measuring node according to the present invention may be described in the general context of computer-executable instructions, such as program modules, being executed by a computer. Generally, program modules include routines, programs, objects, components, data structures, etc., which perform particular tasks or implement particular abstract data types. The measuring node according to the present invention may also be practiced in distributed computing environments where tasks are performed by remote processing devices that are linked through a communications network. In a distributed computing environment, program modules may be located in both local and remote computer storage media including memory storage devices.

The methods and system described herein may be at least partially embodied in the form of computer-implemented processes and apparatus for practicing those processes. The disclosed methods may also be at least partially embodied in the form of tangible, non-transient machine readable storage media encoded with computer program code. The media may include, for example, RAMs, ROMs, CD-ROMs, DVD-ROMs, BD-ROMs, hard disk drives, flash memories, or any other non-transient machine-readable storage medium, or any combination of these mediums, wherein, when the computer program code is loaded into and executed by a computer, the computer becomes an apparatus for practicing the method. The methods may also be at least partially embodied in the form of a computer into which computer program code is loaded and/or executed, such that, the computer becomes an apparatus for practicing the methods. When implemented on a general-purpose processor, the computer program code segments configure the processor to create specific logic circuits. The methods may alternatively be at least partially embodied in a digital signal processor formed of application specific integrated circuits for performing the methods.

While there have been described and pointed out fundamental novel features of the invention as applied to a preferred embodiment thereof, it will be understood that various omissions and substitutions and changes, in the form and details of the embodiments illustrated, may be made by those skilled in the art without departing from the spirit of the invention. The invention is not limited by the embodiments described above which are presented as examples only but can be modified in various ways within the scope of protection defined by the appended patent claims. The appended claims should be construed broadly, to include other variants and embodiments, which may be made by those skilled in the art.

What is claimed is:

1. A method comprising the steps of:
   transmitting a plurality of probes from a local node to a remote node over a digital communication network such that a plurality of responses is received by said local node, wherein each of said plurality of probes comprises at least one probe packet and is configured by said local node to cause: (a) said at least one probe packet traverse an identical forward network path from said local node to said remote node, (b) said at least one probe packet elicit said remote node to transmit one of said responses comprising a plurality of response packets, (c) said plurality of response packets traverse an identical reverse network path from said remote node to said local node;
   determining for each of said plurality of response packets a minimum round-trip packet delay between the time transmitting said probe and the time receiving said response packet; and
   calculating a plurality of pair-wise minimum delay differences from said plurality of minimum round-trip packet delays, wherein said plurality of pair-wise minimum delay differences are used by said local node to compute network path capacities and a degree of capacity asymmetry between said local node and said remote node;
   wherein:
      each of said plurality of probes comprises a first back-to-back pair of packets consisting of a first probe packet and a second probe packet, and a second back-to-back pair of packets consisting of a third probe packet and a fourth probe packet;
      each of said plurality of responses comprises a first response packet elicited by said first probe packet, a second response packet elicited by said second probe packet, and a back-to-back pair of third response packet and fourth response packet elicited by said fourth probe packet;
      said plurality of minimum round-trip packet delays comprise: (a) minimum first round-trip packet delay between the time transmitting said probe and the time receiving said first response packet elicited by said probe, (b) minimum second round-trip packet delay between the time transmitting said probe and the time receiving said second response packet elicited by said probe, (c) minimum third round-trip packet delay between the time transmitting said probe and the time receiving said third response packet elicited by said probe, and (d) minimum fourth round-trip packet delay between the time transmitting said probe and the time receiving said fourth response packet elicited by said probe.

2. The method of claim 1, wherein:
   said first, second, third, and fourth probe packets and said first, second, third, and fourth response packets are configured to have an identical packet size; and
   said plurality of pair-wise minimum delay differences include: (a) first minimum delay difference by subtracting said minimum first round-trip packet delay from said minimum third round-trip packet delay, (b) second minimum delay difference by subtracting said minimum third round-trip packet delay from said minimum fourth round-trip packet delay, (c) third minimum delay difference by subtracting said minimum second round-trip packet delay from said minimum fourth round-trip packet delay, (d) fourth minimum delay difference by subtracting said minimum first round-trip packet delay from said minimum second round-trip packet delay, and (e) fifth minimum delay difference by subtracting said minimum first round-trip packet delay from said minimum fourth round-trip packet delay.

3. The method of claim 2, wherein said network path capacities comprise forward capacity of said forward network path, reverse capacity of said reverse network path, faster-path capacity which is the maximum of said forward capacity and said reverse capacity, and slower-path capacity which is the minimum of said forward capacity and said reverse capacity.

4. The method of claim 3, wherein said degree of capacity asymmetry is a ratio of said forward capacity to said reverse capacity.

5. The method of claim 3, wherein said forward capacity is computed as said packet size divided by said first minimum delay difference.

6. The method of claim 3, wherein said reverse capacity is computed as said packet size divided by said second minimum delay difference.

7. The method of claim 3, wherein said faster-path capacity is computed as said packet size divided by said third minimum delay difference.

8. The method of claim 3, wherein said slower-path capacity is computed as said packet size divided by said fourth minimum delay difference.

9. The method of claim 3, wherein calculation operation of said degree of capacity asymmetry comprises: (a) computing a ratio of said second minimum delay difference to said fourth minimum delay difference, and (b) computing a ratio of said fourth minimum delay difference to said first minimum delay difference.

10. The method of claim 3, wherein a ratio of said fifth minimum delay difference and said fourth minimum delay difference is computed to determine whether said forward capacity and said reverse capacity are identical or different.

11. The method of claim 1, wherein said digital communication network is the Internet.

12. The method of claim 1, wherein said forward network path comprises a plurality of nodes.

13. The method of claim 1, wherein said reverse network path comprises a plurality of nodes.

14. The method of claim 1, wherein said nodes are linked by wire, wireless, or mixed wire and wireless connections.

15. The method of claim 1, wherein
   said local node is a TCP client;
   said remote node is a TCP server;

said local node establishes at least one TCP connection with said remote node; and said probe packet and response packet are TCP data packets containing payload data and are transmitted through said at least one TCP connection.

16. The method of claim 1, wherein
said local node is a TCP server;
said remote node is a TCP client;
said remote node establishes at least one TCP connection with said local node; and
said probe packet and response packet are TCP data packets containing payload data and are transmitted through said at least one TCP connection.

17. An article comprising a form of tangible, non-transient machine readable storage media encoded with computer program code, which can be loaded into a computer and executed by the computer to perform the steps comprising:
transmitting a plurality of probes from a local node to a remote node over a digital communication network such that a plurality of responses is received by said local node, wherein each of said plurality of probes comprises at least one probe packet and is configured by said local node to cause: (a) said at least one probe packet traverse an identical forward network path from said local node to said remote node, (b) said at least one probe packet elicit said remote node to transmit one of said responses comprising a plurality of response packets, (c) said plurality of response packets traverse an identical reverse network path from said remote node to said local node;
determining for each of said plurality of response packets a minimum round-trip packet delay between the time transmitting said probe and the time receiving said response packet; and
calculating a plurality of pair-wise minimum delay differences from said plurality of minimum round-trip packet delays, wherein said plurality of pair-wise minimum delay differences are used by said local node to compute network path capacities and a degree of capacity asymmetry between said local node and said remote node, wherein:
each of said plurality of probes comprises a first back-to-back pair of packets consisting of a first probe packet and a second probe packet, and a second back-to-back pair of packets consisting of a third probe packet and a fourth probe packet;
each of said plurality of responses comprises a first response packet elicited by said first probe packet, a second response packet elicited by said second probe packet, and a back-to-back pair of third response packet and fourth response packet elicited by said fourth probe packet;
said plurality of minimum round-trip packet delays comprise: (a) minimum first round-trip packet delay between the time transmitting said probe and the time receiving said first response packet elicited by said probe, (b) minimum second round-trip packet delay between the time transmitting said probe and the time receiving said second response packet elicited by said probe, (c) minimum third round-trip packet delay between the time transmitting said probe and the time receiving said third response packet elicited by said probe, and (d) minimum fourth round-trip packet delay between the time transmitting said probe and the time receiving said fourth response packet elicited by said probe.

18. The article of claim 17, wherein:
said first, second, third, and fourth probe packets and said first, second, third, and fourth response packets are configured to have an identical packet size; and
said plurality of pair-wise minimum delay differences include: (a) first minimum delay difference by subtracting said minimum first round-trip packet delay from said minimum third round-trip packet delay, (b) second minimum delay difference by subtracting said minimum third round-trip packet delay from said minimum fourth round-trip packet delay, (c) third minimum delay difference by subtracting said minimum second round-trip packet delay from said minimum fourth round-trip packet delay, (d) fourth minimum delay difference by subtracting said minimum first round-trip packet delay from said minimum second round-trip packet delay, and (e) fifth minimum delay difference by subtracting said minimum first round-trip packet delay from said minimum fourth round-trip packet delay.

19. The article of claim 18, wherein said network path capacities comprise forward capacity of said forward network path, reverse capacity of said reverse network path, faster-path capacity which is the maximum of said forward capacity and said reverse capacity, and slower-path capacity which is the minimum of said forward capacity and said reverse capacity.

20. The article of claim 19, wherein said degree of capacity asymmetry is a ratio of said forward capacity to said reverse capacity.

* * * * *